(12) United States Patent
Li et al.

(10) Patent No.: US 9,088,510 B2
(45) Date of Patent: Jul. 21, 2015

(54) UNIVERSAL RATE CONTROL MECHANISM WITH PARAMETER ADAPTATION FOR REAL-TIME COMMUNICATION APPLICATIONS

(71) Applicants: Jin Li, Sammamish, WA (US); Sanjeev Mehrotra, Kirkland, WA (US); Di Xie, West Lafayette, IN (US)

(72) Inventors: Jin Li, Sammamish, WA (US); Sanjeev Mehrotra, Kirkland, WA (US); Di Xie, West Lafayette, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 13/718,114

(22) Filed: Dec. 18, 2012

(65) Prior Publication Data

US 2013/0128735 A1    May 23, 2013

Related U.S. Application Data

(63) Continuation-in-part of application No. 12/970,952, filed on Dec. 17, 2010, now Pat. No. 8,570,864.

(51) Int. Cl.
| | |
|---|---|
| *H04L 12/26* | (2006.01) |
| *H04L 12/825* | (2013.01) |
| *H04L 1/00* | (2006.01) |
| *H04L 12/815* | (2013.01) |

(Continued)

(52) U.S. Cl.
CPC .............. *H04L 47/25* (2013.01); *H04L 1/0002* (2013.01); *H04L 1/0015* (2013.01); *H04L 1/0034* (2013.01); *H04L 43/0882* (2013.01); *H04L 47/263* (2013.01); *H04L 47/12* (2013.01); *H04L 47/193* (2013.01); *H04L 47/20* (2013.01); *H04L 47/22* (2013.01); *H04L 47/2408* (2013.01); *H04L 47/2416* (2013.01); *H04L 47/2441* (2013.01); *H04L 47/34* (2013.01)

(58) Field of Classification Search
None
See application file for complete search history.

(56) References Cited

U.S. PATENT DOCUMENTS

| 7,554,922 B2 | 6/2009 | Vega-Garcia et al. |
| 2003/0097461 A1* | 5/2003 | Barham et al. ............... 709/235 |

(Continued)

OTHER PUBLICATIONS

Mehrotra, et al., "Congestion Control for Interactive Real-Time Applications", IETF congestion control workshop, Jul. 28, 2012, pp. 3.

(Continued)

*Primary Examiner* — Minh-Trang Nguyen
(74) *Attorney, Agent, or Firm* — Brandon Roper; Judy Yee; Micky Minhas

(57) ABSTRACT

A "Universal Rate Control Mechanism with Parameter Adaptation" (URCMPA) improves real-time communication (RTC) sessions in terms of delay, loss, throughput, and PSNR. The URCMPA automatically learns network characteristics including bottleneck link capacity, inherent queuing delay, inherent packet loss rates, etc., during RTC sessions. The URCMPA uses this information to dynamically adapt rate control parameters in a utility maximization (UM) framework. The URCMPA operates reliable RTC sessions across a wide range and combination of networks near full throughput rates while maintaining low operating congestion levels (e.g., low queuing delay and low packet loss). Examples of networks applicable for use with the URCMPA include, but are not limited to, combinations of mobile broadband (e.g., 3G, 4G, etc.), WiMAX, Wi-Fi hotspots, etc., and physical networks based on cable, fiber, ADSL, etc. The URCMPA can also dynamically adapt operating congestion levels relative to competing TCP flows to maintain fair use of network resources.

20 Claims, 5 Drawing Sheets

(51) Int. Cl.
H04L 12/801 (2013.01)
H04L 12/813 (2013.01)
H04L 12/851 (2013.01)
H04L 12/853 (2013.01)

(56) References Cited

U.S. PATENT DOCUMENTS

| | | | |
|---|---|---|---|
| 2005/0228896 | A1 | 10/2005 | Nishida |
| 2006/0026004 | A1* | 2/2006 | Van Nieuwenhuizen ......... 705/1 |
| 2009/0164657 | A1 | 6/2009 | Li et al. |
| 2011/0051607 | A1 | 3/2011 | Begen |
| 2011/0170408 | A1* | 7/2011 | Furbeck et al. ............... 370/230 |
| 2011/0216648 | A1 | 9/2011 | Mehrotra et al. |
| 2011/0299389 | A1 | 12/2011 | Mau et al. |
| 2012/0147750 | A1* | 6/2012 | Pelletier et al. ............... 370/235 |

OTHER PUBLICATIONS

Alizadeh, et al., "DCTCP: Efficient Packet Transport for the Commoditized Data Center", In Proceedings of ACM SIGCOMM Conference on Data Communication, Aug. 30, 2010, pp. 15.

Brakmo, et al., "TCP Vegas: End-to-End Congestion Avoidance on a Global Internet", In IEEE Journal on Selected Areas in Communications, vol. 13, Issue 8, Oct. 1995, pp. 22.

Chen, et al., "Utility Maximization in Peer-to-Peer Systems", In Proceedings of the ACM International Conference on Measurement and Modeling of Computer Systems, Jun. 2, 2008, pp. 13.

Chiang, et al., "Layering as Optimization Decomposition: A Mathematical Theory of Network Architectures", In Proceedings of the IEEE, vol. 95, Issue 1, Jan. 2007, pp. 58.

Floyd, et al., "Equation-Based Congestion Control for Unicast Applications", In Proceedings of ACM SIGCOMM, Aug. 2000, pp. 14.

Floyd, et al., "The NewReno Modification to TCP's Fast Recovery Algorithm", In RFC the NewReno Modification to TCP's Fast Recovery Algorithm, Apr. 1999, pp. 13.

Sühring, Karsten, "H.264/14496-10 AVC Reference Software Manual", Joint Video Team (JVT) of ISO/IEC MPEG & ITU-T VCEG (ISO/IEC JTC1/SC29/WG11 and ITU-T SG16 Q.6) 31st Meeting: London, UK, Jun. 28-Jul. 3, 2009, pp. 90.

Ha, et al., "CUBIC: A New TCP-Friendly High-Speed TCP Variant", In Newsletter ACM Operating Systems Review—Research and Developments in the Linux Kernel, vol. 42, Issue 5, Jul. 2008, pp. 12.

Handley, et al., "TCP Friendly Rate Control (TFRC): Protocol Specification", Retrieved at <<http://ietfreport.isoc.org/rfc/PDF/rfc3448.pdf>>, In RFC of TCP Friendly Rate Control (TFRC), Jan. 2003, pp. 25.

Huang, et al., "A Close Examination of Performance and Power Characteristics of 4G LTE Networks", In Proceedings of the 10th International Conference on Mobile Systems, Applications, and Services, Jun. 25, 2012, pp. 14.

Jacobson, Van., "Congestion Avoidance and Control", In Symposium Proceedings on Communications Architectures and Protocols, vol. 18, Issue 4, Aug. 1988, pp. 16.

Jain, et al., "End-to-End Available Bandwidth: Measurement Methodology, Dynamics, and Relation with TCP Throughput", In IEEE/ACM Transactions on Networking, vol. 11, Issue 4, Aug. 2003, pp. 13.

Jain, et al., "Ten Fallacies and Pitfalls on End-to-End Available Bandwidth Estimation", In Proceedings of the 4th ACM Conference on Internet Measurement, Oct. 25, 2004, pp. 6.

Kelly, Frank., "Fairness and Stability of End-to-End Congestion Control", In European Journal of Control, Sep. 2003, pp. 36.

Kelly, et al., "Rate Control for Communication Networks: Shadow Prices, Proportional Fairness, and Stability", In Journal of the Operational Research Society, vol. 49, Mar. 1998, pp. 16.

Low, et al., "Optimization Flow Control, I: Basic Algorithm and Convergence", In Journal on IEEE/ACM Transactions on Networking, vol. 7, Issue 6, Dec. 1999, pp. 16.

Low, et al., "Understanding Vegas: A Duality Model", In Journal of the ACM, vol. 49, Issue 2, Mar. 2002, pp. 29.

Lundin, et al., "A Google Congestion Control Algorithm for Real-Time Communication on the World Wide Web", Retrieved at <<http://tools.ietf.org/id/draft-alvestrand-rtcweb-congestion-02>>, In IETF Internet-Draft, Apr. 25, 2012, pp. 16.

Mehrotra, et al., "Bandwidth Management for Mobile Media Delivery", In Proceedings of the IEEE Global Communications Conference, Dec. 3, 2012 (previously published as Microsoft Technical Report MSR-TR-2011-105, Nov. 2011), pp. 12.

Alvestrand, H., "Overview: Real Time Protocols for Brower-based Applications draft-ietf-rtcweb-overview-05", Internet Engineering Task Force (IETF), Dec. 14, 2012, 23 Pages.

Song, et al., "Utility-Based Resource Allocation and Scheduling in OFDM-Based Wireless Broadband Networks", In IEEE of Communications Magazine, vol. 43, Issue 12, Dec. 2005, pp. 8.

Strauss, et al., "A Measurement Study of Available Bandwidth Estimation Tools", In Proceedings of the 3rd ACM SIGCOMM Conference on Internet Measurement, Oct. 27, 2003, pp. 6.

Tan, et al., "A Compound TCP Approach for High-Speed and Long Distance Networks", In Proceedings of 25th IEEE International Conference on Computer Communications, Apr. 2006, pp. 12.

\* cited by examiner

UNIVERSAL RATE CONTROL MECHANISM WITH PARAMETER ADAPTATION FOR REAL-TIME COMMUNICATION APPLICATIONS

CROSS-REFERENCE TO RELATED APPLICATIONS

This application is a Continuation-in-Part of a prior application entitled "UNIVERSAL DYNAMIC BANDWIDTH MANAGEMENT" which was filed with the USPTO on Dec. 17, 2010, and assigned Ser. No. 12/970,952, the subject matter of which is incorporated herein by this reference.

BACKGROUND

As is well known to those skilled in the art, "congestion control" is used to control the transmission rate of network flows so as to maximize throughput while fairly sharing the capacity of bottleneck links in the network. Further, real-time communication (RTC) applications such as video conferencing, tele-presence, online games, virtual-reality, etc., are becoming increasingly popular and constitute a large percentage of Internet traffic.

Although the topics of rate control and congestion control have been extensively studied, most existing research has focused on optimizing throughput performance for non real-time Internet applications, such as file download, web browsing, video-on-demand, etc. Most existing techniques operate at high congestion levels (e.g., high queuing delay and packet loss rates) to increase throughput levels, thereby resulting in poor performance for RTC-type applications. Conversely, low operating congestion levels (e.g., low queuing delay and low packet loss) tend to provide an improved user experience with respect to RTC-type applications. Unfortunately, existing techniques that attempt to operate at low congestion levels do not generally work reliably across increasingly complex combinations of wired and wireless networks (e.g., 3G, 4G, Wi-Fi, WiMAX, etc.) which tend to exhibit significant noise in congestion signals.

More specifically, the performance of RTC applications depends on total throughput as well as operating queuing delay and packet loss. As an example, video conferencing generates perceivable delay degradation to human observers if the end-to-end delay exceeds about 200 ms or the uncorrectable packet loss is larger than about 1%. At the same time, these applications are also bandwidth intensive, as a higher operating bandwidth leads to increased audio/visual quality. Unfortunately, most existing congestion control techniques consider only bandwidth utilization as a primary metric and consider a high operating congestion level to be acceptable. Consequently, existing congestion control techniques generally fail to deliver satisfactory performance for RTC-type applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Universal Rate Control Mechanism with Parameter Adaptation" (URCMPA), as described herein, provides a rate control protocol for real-time communication (RTC)-type applications. The URCMPA provides various techniques for improving the performance of RTC sessions in terms of factors including, but not limited to, delay, loss, throughput, and Peak Signal-to-Noise Ratio (PSNR). The techniques described herein have been observed to work well under a wide range of network conditions by dynamically working to minimize congestion induced operating queuing delay and packet loss while achieving high throughput. RTC-type applications applicable for use with the URCMPA include, but are not limited to, video conferencing, tele-presence, online games, virtual-reality, etc. Examples of networks applicable for use with the URCMPA include, but are not limited to, any desired combination of mobile broadband (e.g., 3G, 4G, etc.), WiMAX, Wi-Fi hotspots, etc., having high inherent noise levels due to physical layer issues, and physical networks based on cable, fiber, ADSL, etc., having relatively smaller noise levels that are generally due to scheduling issues.

More specifically, the URCMPA automatically learns and/or estimates network characteristics such as bottleneck link capacity, inherent queuing delay, and inherent packet loss rates, on an ongoing basis during RTC sessions. This information is then used to dynamically adapt rate control parameters in a utility maximization (UM) framework. This allows the URCMPA to operate reliable RTC sessions across a wide range and combination of wired and wireless networks types at close to full throughput rates while maintaining low operating congestion levels (e.g., low queuing delay and low packet loss rates). In various embodiments, the URCMPA also dynamically adapts operating congestion levels relative to competing TCP flows to maintain fair use of network resources.

The aforementioned co-pending patent application entitled "UNIVERSAL DYNAMIC BANDWIDTH MANAGEMENT" (UDBM) generally describes various methods and techniques for learning the operating congestion level of a network, which can be quite complicated and noisy for a real network. The learned congestion level is then used to adjust the communications rate. Further, the UDBM generally operates by differentiating periods of congestion from periods of non-congestion for learning the operating congestion level reliably. In contrast, the URCMPA described herein automatically adapts rate control parameters, which are then used to compute a new sending rate (and rate of convergence to the new sending rate), using simple rules based on the use of congestion signals, for adapting to changing network conditions. Further, the rate adaptation provided by the URCMPA does not require differentiating periods of congestion from periods of non-congestion. As such, the URCMPA is more capable of managing the bandwidth of RTC-type applications for a wide range of complicated network scenarios and configurations than are the methods and techniques described in the co-pending patent application.

In view of the above summary, it is clear that the URCMPA described herein provides various techniques for using learned network characteristics to dynamically adapt rate control parameters of a UM framework during RTC sessions to improve overall session performance parameters. In addition to the just described benefits, other advantages of the URCMPA will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
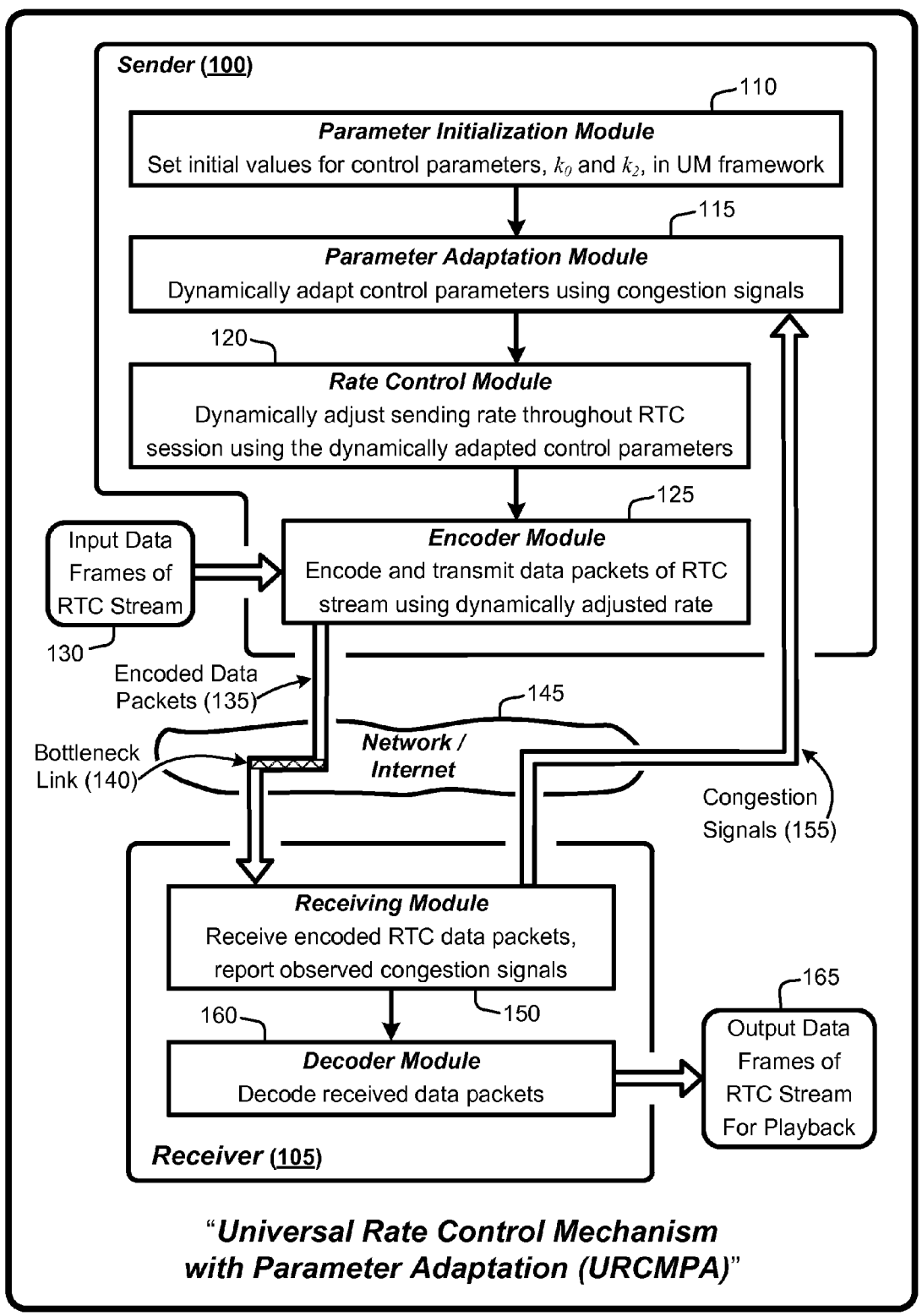
FIG. 1 illustrates a general flow diagram that illustrates program modules for using learned network characteristics to dynamically adapt rate control parameters in a Utility Maximization (UM) framework during real-time communications (RTC) sessions to improve overall session performance parameters using a "Universal Rate Control Mechanism" (URCMPA) as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, a "Universal Rate Control Mechanism with Parameter Adaptation" (URCMPA), as described herein, addresses the problem of rate control (congestion control) for real-time communication (RTC) type applications, including, but not limited to VoIP, video conferencing, online gaming, desktop remoting, interactive software applications, etc. The URCMPA improves the performance of RTC sessions in terms of delay, loss, throughput, and Peak Signal-to-Noise Ratio (PSNR) across a wide variety and combination of networks. Examples of networks applicable for use with the URCMPA include, but are not limited to any desired combination of mobile broadband (e.g., 3G, 4G, etc.), WiMAX, Wi-Fi hotspots, etc., having high inherent noise levels due to physical layer issues, and physical networks based on cable, fiber, ADSL, etc., having relatively smaller noise levels that are generally due to scheduling issues.

The URCMPA automatically determines network characteristics between senders and receivers including, but not limited to, bottleneck link capacity, noise in queuing delay, noise in packet loss, etc., throughout RTC sessions. This information is used to dynamically adapt parameters in a utility maximization (UM) rate control framework to deliver full throughput, fairness across multiple flows, fair sharing, and low operating queuing delay and packet loss levels. This dynamic parameter adaptation allows the URCMPA to operate reliable RTC sessions across a wide range and combination of networks at close to full throughput rates while maintaining low operating congestion levels (e.g., low queuing delay and low packet loss).

In other words, the URCMPA adaptively sets its operating parameters by learning and/or estimating network characteristics such as bottleneck link capacity, queuing delay noise, and packet loss noise. By adapting its parameters, URCMPA is able to achieve almost full link utilization at low congestion levels (in terms of queuing delay and packet loss). Further, the URCMPA performs dynamic in-session parameter adaptation, and corrects for mis-estimation of inherent network parameters while adapting to changing network conditions.

Advantageously, multiple URCMPA flows fairly share network bottleneck links while minimally increasing the congestion level. Further, in various embodiments, whenever a competing TCP flow enters the bottleneck link, the URCMPA is capable of increasing its operating congestion level to effectively compete and fairly share the link capacity. Then, once the TCP flow leaves the bottleneck link, the URCMPA returns its operating congestion level to low values. These capabilities enable the URCMPA to operate across a wide range of complex real networks to provide improvements in both objective and subjective quality of various RTC sessions.

1.1 System Overview

As noted above, the "URCMPA," provides various techniques for using learned network characteristics to dynamically adapt rate control parameters in a Utility Maximization (UM) framework during RTC sessions to improve observed session performance. The processes summarized above are illustrated by the general system diagram of FIG. 1. In particular, the system diagram of FIG. 1 illustrates the interrelationships between program modules for implementing various embodiments of the URCMPA, as described herein. Furthermore, while the system diagram of FIG. 1 illustrates a high-level view of various embodiments of the URCMPA, FIG. 1 is not intended to provide an exhaustive or complete illustration of every possible embodiment of the URCMPA as described throughout this document.

In addition, it should be noted that any boxes and interconnections between boxes that may be represented by broken or dashed lines in FIG. 1 represent alternate embodiments of the URCMPA described herein, and that any or all of these alternate embodiments, as described below, may be used in combination with other alternate embodiments that are described throughout this document.

As illustrated by FIG. 1, the processes enabled by the URCMPA enable adaptive rate control across arbitrary networks for RTC sessions between a sender and a receiver. Note that in a typical two-way RTC session, each computing device involved in the communication session will generally act as both a sender 100 and a receiver 105. As such, it should be understood that any computing device acting as a sender 100 performs the actions illustrated by FIG. 1 with respect to the sender. Similarly, it should be understood that any computing device acting as a receiver 105 performs the actions illustrated by FIG. 1 with respect to the receiver. However, it should also be understood that the URCMPA also enables real-time one-way communications scenarios where the sender 100 acts only as a sender and the receiver 105 acts only as a receiver. In each case, each computing device operates using a separate instantiation of the URCMPA for rate control purposes.

In general, as illustrated by FIG. 1, throughout an RTC session, congestion signals, including, but not limited to, observed queuing delay, $\delta$, and packet loss, $\epsilon$ are used to infer congestion level, $\rho$, using a function $f$. UM-based rate control parameters, $k_0$ and $k_2$, are dynamically adapted throughout the RTC session and used to adjust the current rate R by an amount $\Delta R$ as a function of $\rho$.

In general, the sending rate of the communications session is adjusted on a per-packet basis using estimates of current per-packet congestion levels throughout the communication session. Alternately, the sending rate of the communications session is adjusted based on average congestion level estimates over a sliding window of sequential packets throughout the communication session. In other words, the rate is adjusted as a function of current congestion level estimates, the current sending rate, and the two UM rate control parameters, $k_0$ and $k_2$, such that $\Delta R = f(\delta, \epsilon, R, k_0, k_2)$. Note that as discussed below, other congestion signals, such as ECN (Explicit Congestion Notification) markings, may also be factored into the rate change processes described herein.

The rate control parameters, $k_0$ and $k_2$, are updated using longer term averages (e.g., averages computed over sliding windows of time) of the congestion signals ($\delta^{AVE}$) as well as a longer term average of sending rate ($R^{AVE}$), bottleneck link capacity ($R_{MAX}$), and minimum congestion signals seen in an "uncongested state" (i.e., when the aggregate rate into the bottleneck link is below the estimated or measured capacity of the bottleneck link). In other words, as discussed in further detail throughout this document, $k_2 = h(\delta^{AVE}, \delta_0, R^{AVE}, R_{MAX}, M)$ and $k_0 = g(\delta^{AVE}, \delta_0, R^{AVE}, R_{MAX}, \beta)$, where h and g are functions of the mentioned parameters. Further, other congestion signals, such as ECN markings, may also be factored into the adaptation of the rate control parameters, $k_0$ and $k_2$.

More specifically, the URCMPA achieves rate control by using a parameter initialization module 110 to set initial values for rate control parameters in a UM framework. Note that the parameter initialization module 110 is also used in various embodiments to set an initial sending rate for the RTC session. Initialization of rate control parameters is discussed in further detail in Section 2.3 and in Section 2.6.1.

Once the rate control parameters have been initialized, a parameter adaptation module 115 then operates to dynamically adapt the rate control parameters on an ongoing basis throughout the RTC session based on various congestion signals reported to the parameter adaptation module. Note that congestion signals are discussed in further detail in Section 2.1, with adaptation of the rate control parameters discussed in further detail in Section 2.6.2.

A rate control module 120 then uses the dynamically adapted rate control parameters to dynamically adjust the sending rate of the RTC session to achieve a desired congestion level. In general, rate control is performed on a per-packet basis. However, in other embodiments of the URCMPA, rate control is instead performed over longer periods evaluated in terms of sliding windows. Note that dynamic adjustment of the rate control parameters and the sending rate can be performed at any desired time intervals (e.g., per-packet, sliding windows, etc.), and that the time interval for adapting the rate control parameters may differ from the time interval for adapting the sending rate. Once the current sending rate has been set, an encoder module 125 uses any desired encoding technique to encode and transmit incoming data frames of the RTC stream 130 at the current sending rate.

Transmission of encoded data packets 135 is provided across a bottleneck link 140 in an arbitrary network/Internet 145 to a receiving module 150 of the receiver 105. The receiving module 150 receives encoded data packets 135 and reports corresponding observed congestion signals 155 back to the sender 100 via the arbitrary network/Internet 145. As discussed above, the congestion signals 155 are used by the parameter adaptation module 115 to dynamically adapt the rate control parameters throughout the RTC session. Finally, a decoder module 160 decodes the encoded data packets 135 and provides corresponding output data frames 165 of the RTC stream for playback.

2.0 Operational Details of the URCMPA

The above-described program modules are employed for implementing various embodiments of the URCMPA. As summarized above, the URCMPA provides various techniques for using learned network characteristics to dynamically adapt rate control parameters in a UM framework during RTC sessions to improve observed session performance. The following sections provide a detailed discussion of the operation of various embodiments of the URCMPA, and of exemplary methods for implementing the program modules described in Section 1 with respect to FIG. 1. In particular, the following sections provides discussion, examples and operational details of various embodiments of the URCMPA, including:

- a discussion of various congestion control considerations;
- notations and definitions used to describe and define various features and embodiments of the URCMPA;
- an operational overview of the URCMPA;
- a discussion of a general URCMPA architecture and applications;
- exemplary URCMPA Architecture and Applications;
- a discussion of the Utility Maximization (UM) rate control framework;
- adaptive parameter adjustments in the UM framework; and
- a discussion of clock compensation techniques for estimating queuing delay using one-way delay information between a sender and a receiver.

2.1 Congestion Control Considerations

In general, the performance of RTC-type applications is very sensitive to high queuing delay and packet loss. Consequently, congestion control techniques adapted to operate at high congestion levels are generally ill-suited for RTC-type applications. For example, loss-based TCP variants of congestion control techniques typically provide algorithms that only back off when a packet loss is observed, which generally occurs when the queues at bottleneck links are full. Since detecting congestion at high operating levels is relatively easier than detecting it at low levels (due to the potential presence of noise), these algorithms rarely suffer from false positive congestion detection (at least on wired networks) and thus maximize the throughput at the expense of a high operating congestion level. Related techniques provide congestion control mechanisms for media streaming that also operate at a high operating congestion level, with one of the primary criteria of such techniques being to maintain a fair share of bandwidth with competing TCP traffic while maintaining a smoother variation of rate given the same approximate operating congestion level.

In contrast, various queuing delay based TCP rate control schemes attempt to operate at lower congestion levels. These types of rate control schemes work relatively well in a clean network environment such as a datacenter. However, for most RTC-type applications, the bottleneck link (typically an Internet link) is outside of the datacenter. In practice, it is very challenging to get queuing delay based TCP rate control algorithms to work reliably over a wide range of networks and network conditions that may be present on the Internet between arbitrary senders and receivers. This is because these techniques tend to rely on obtaining clean congestion signals such as queuing delay, packet loss, and ECN (Explicit Congestion Notification) markings. Unfortunately, in real-world environments, there tends to be significant noise in these congestion signals that is common when operating in increasingly complex networks, e.g., combinations of Wi-Fi, WiMAX, and 3G/4G between senders and receivers. This noise is not typically due to long-term congestion, but is rather caused by short-term fluctuations in network capacity. Unfortunately, by responding to noise that is a false congestion signal, these algorithms usually suffer from under-utilization of bandwidth at the bottleneck links.

Note that ECN markings represent a well-known extension to existing TCP/IP protocols. ECN markings allow end-to-end notification of network congestion without dropping packets. ECN is an optional feature that is only used when both endpoints support it and are willing to use it. Further, it is only effective when supported by the underlying network, for example if underlying routers and switches in the network mark packets with ECN.

Another class of rate control algorithms designed to operate at lower congestion levels includes available bandwidth estimation (ABE)-based techniques that are commonly used in video conferencing applications. In general, ABE-based techniques typically attempt to estimate the available bandwidth by observing the queuing behavior of a pair or a train of packets sent prior to or at the start of an RTC session. These techniques then operate throughout the RTC session at a certain percentage below this to avoid congestion. ABE relies upon the strong assumption that the majority of the delay experienced by the packet can be attributed to queuing behavior (congestion) at the bottleneck link. As networks have grown in complexity, this assumption no longer holds true in many cases. For example, in networks and combinations of networks including Wi-Fi, 3G, 4G, WiMAX, etc., significant noise in queuing delay and packet loss can be observed during operation, with much of this noise attributable to either link layer retransmissions or the scheduling behavior.

For example, 3GPP (i.e., $3^{rd}$ generation mobile broadband standard) uses a packet scheduler that bases its scheduling decisions on signal strength and long-term proportional fairness of the users, which can lead to high delay noise in the network regardless of congestion. Even in relatively high-speed ADSL, fiber or cable modem based network access scenarios, packet delay can be caused by the rate shaping policy of the Internet Service Provider (ISP) as well as latency and loss experienced by other sections of the network. Consequently, ABE algorithms tend to suffer from underutilization of network bandwidth as network noise levels increase.

2.2 Notations and Definitions

The following terms and notations are used to describe and define various features and embodiments of the URCMPA:

TABLE 1

Notation and Definitions

| | |
|---|---|
| $\delta$ | The end-to-end observed queuing delay. $\delta^{cong}$ (also "$\phi$") is defined as the congestion induced queuing delay and $\delta^{rand}$ is defined as the random queuing delay due to noise along the link path (from sender to receiver) or due to measurement noise. |
| $\epsilon$ | The end-to-end observed packet loss rate. $\epsilon^{cong}$ is defined as the congestion induced packet loss rate and $\epsilon^{rand}$ is defined as the random packet loss rate. |
| $\rho$ | The true congestion level. |
| $\hat{\rho}$ | The current operating congestion level of the URCMPA as defined in Section 2.6.1. Similarly $\hat{\delta}$ and $\hat{\epsilon}$ are defined as as the operating queuing delay and operating packet loss rate respectively. |

TABLE 1-continued

Notation and Definitions

| | |
|---|---|
| $E[\delta^{rand}]$ | The average random queuing delay. Similarly, $E[\epsilon^{rand}]$ is defined as the average random packet loss rate. This can be estimated during uncongested periods. |
| $\delta_0$ | The estimated average random queuing delay, i.e., URCMPA's estimate of $E[\delta^{rand}]$. Similarly, $\epsilon_0$ is defined as an estimate of $E[\epsilon^{rand}]$. |
| C | The true capacity of the bottleneck link. |
| $R^{MAX}$ | The estimated capacity of the bottleneck link, i.e., an estimate of C. |
| R | The current transmission rate specified by the URCMPA. $\hat{R}$ refers to the steady-state operating transmission rate. |
| $k_0$ | The parameter in URCMPA used to determine the operating congestion level, $\hat{\rho}$. |
| $k_2$ | The parameter in URCMPA used to determine rate of convergence and oscillation. |

2.3 Operational Overview of the URCMPA

In general, the URCMPA evaluates various congestion signals or information including, but not limited to, any combination of queuing delay, packet loss, ECN markings, etc. The URCMPA then uses this information to dynamically adapt rate control parameters of a UM framework to control data rates of RTC sessions or other flows under the constraint of attempting to provide full and fair link utilization for bottleneck links in the presence of competing data flows while operating at low congestion levels. Again, the concept of low congestion levels generally corresponds to using a transmission rate that operates at either or both low queuing delay and/or low packet loss (and/or low levels for other congestion signals). A low operating congestion level is one where the following network parameters or some function of the following parameters is low: congestion-induced packet queuing delay, congestion-induced packet loss rate, or congestion-induced ECN markings. Congestion-induced parameters are those that are caused by queuing behavior when the aggregate sending rate is higher than the capacity of the bottleneck link.

Rate control parameters in a conventional UM framework include, among other things, a first parameter for controlling an operating congestion level, $\hat{\rho}$, during a communications session, and a second parameter for controlling a rate of convergence (and thus oscillation) of the communications rate. More specifically, the first control parameter of the UM framework, referred to herein as $k_0$, controls the operating congestion level as a function of congestion signals in the network. In general, if the value of $k_0$ is high, there will be a high congestion level during the session. Conversely, if $k_0$ is low, there will be a lower operating congestion level during the session. The second control parameter of the UM framework, referred to herein as $k_2$, controls a rate of convergence towards a particular communications rate.

Conventional UM-based rate control techniques vary or adjust the data rate of a communications session based on variations in congestion signals (e.g., queuing delay and packet loss) during the communications session using fixed rate control parameters (i.e., fixed values for values for $k_0$ and $k_2$). For example, as the congestion levels increase during a typical UM-based communications session, the UM framework will use the fixed value of $k_0$ to reduce the communications rate, with the fixed value of $k_2$ controlling how fast the communications rate will converge towards a new communications rate. Unfortunately, using fixed rate control parameters has been observed to provide relatively poor utilization of bottleneck links across complex networks or combinations of networks.

Further, the aforementioned co-pending patent application entitled "UNIVERSAL DYNAMIC BANDWIDTH MANAGEMENT" (UDBM) generally describes various methods and techniques for learning the operating congestion level of a network, which can be quite complicated and noisy for a real network. The learned congestion level is then used to adjust the communications rate. Further, the UDBM generally operates by differentiating periods of congestion from periods of non-congestion for learning the operating congestion level reliably. In contrast, the URCMPA described herein automatically adapts rate control parameters, which are then used to compute a new sending rate (and rate of convergence to the new sending rate), using simple rules based on the use of congestion signals, for adapting to changing network conditions. Further, the rate adaptation provided by the URCMPA does not require differentiating periods of congestion from periods of non-congestion. As such, the URCMPA is more capable of managing the bandwidth of RTC-type applications for a wide range of complicated network scenarios and configurations than are the methods and techniques described in the co-pending patent application.

More specifically, the URCMPA dynamically adapts the rate control parameters (i.e., $k_0$ and $k_2$) throughout the communications session as a function of one or more congestion signals (e.g., queuing delay, packet loss, ECN markings, etc.) that are evaluated across sliding windows of time (i.e., sequential instances of a sliding window throughout the session). In other words, unlike conventional UM-based communication sessions that use fixed values of $k_0$ and $k_2$ to vary the rate in response to congestion signals, or UDBM in which complicated learning rule is designed to figure out the value $k_0$ and $k_2$, URCMPA dynamically adjusts values of $k_0$ and $k_2$ to vary the rate in response to congestion signals. Note that in various embodiments, adaptation of $k_0$ and $k_2$ is performed at a different time scale than changes to the communications rate resulting from use of the adapted $k_0$ and $k_2$ in a UM framework. Further, in various embodiments, the URCMPA uses fixed values for $k_2$ while dynamically varying $k_0$ throughout the communications session in response to various congestion signals.

Note that any sliding windows described herein may be implemented using either fixed or variable length sliding windows. Further, the length of the sliding windows can be set using any desired technique. For example, in the case of variable length sliding windows, suppose it is desired to use the minimum, maximum, or average value of delay over a 10 second sliding window. In a traditional implementation, all delay samples corresponding to the 10 second window would be stored to determine these values. Consequently, if the sending rate was 2000 packets/sec, this would equate to 20,000 packets worth of information, which could be done using various memory constructs, such as, for example, a circular buffer. The size of the buffer would grow with both the rate (in packet/sec) and the sliding window size (in seconds). Also although average (and sum) could be done relatively simply (e.g., by a single subtraction and addition), minimum and maximum values are somewhat more complex as such computations would also make use of a sorted array of samples maintained in combination with the circular buffer, with O(N) insertion sorts being performed and a deletion for every new sample that comes in.

However, simpler implementations can be performed using fixed amounts of memory without incurring the sorting penalty noted above by implementing variably sized sliding windows. For example, if it is desired to evaluate a sliding window of approximately 10 seconds, then assuming that a window ranging from about 8 to 12 seconds in length is acceptable, then the following techniques can be used to evaluate the information in the sliding window.

Suppose it is desired to keep track of any or all of the minimum, maximum and/or sum of congestion signals (or other packet-based information) over the following intervals:
    a. Interval 0: $(t_0-8, t_0-4)$
    b. Interval 1: $(t_0-4, t_0)$
    c. Interval 2: $(t_0, t)$
    d. Interval 3: $(t_0-8, t)$
where $0 \leq (t-t_0) \leq 4$. Then when a new sample is added, the min/max/sum is updated for the following two intervals:
    a. Interval 2: $(t_0, t)$
    b. Interval 3: $(t_0-8, t)$
Then, the min/max/avg for the sliding window can be determined by simply querying the values from the Interval 3 $(t_0-8, t)$. Since $0 \leq (t-t_0) \leq 4$, the size of this interval, t, is obviously between 8 to 12 seconds.

Then, once, $t = t_0+4$, the following is performed:
    a. Interval 0 becomes $(t_0-4, t_0)$ which can be done by simply copying from the previous interval 1
    b. Interval 1 becomes $(t_0, t_0+4)$ which can be done by simply copying from the previous interval 2
    c. Interval 2 is reset and represents $(t_0+4, t)$
    d. Interval 3 is then reset by combining statistics from the previous interval 1 and 2 and represents $(t_0-4, t)$ Interval 3 can be easily found since combining two interval statistics is very simple. In particular, the sum over the interval is simply the sum of the two. The minimum is simply the minimum of the two, and the maximum is simply the maximum of the two. Advantageously, the techniques described above completely avoid sorting for min/max and only stores the min/max/sum of the four intervals described above without requiring storing of any per packet information whatsoever.

Further, using the techniques described above, the accuracy of the sliding window length can be adjusted as well. In particular, in view of the preceding example, it can be shown that the window size can be between $(N-\theta, N+\theta)$ by using $(N+\theta)/2\theta+1$ intervals. Each update is then accomplished by updating of two intervals (for the sum, minimum and maximum), and every $(2\theta)$ seconds, the statistics are combined into the total interval using $(N+\theta)/2\theta-1$ additions, minimum operations and maximum operations. Advantageously, this allows the URCMPA to use variably sized sliding windows to scale to extremely high data rates while still being able to maintain accurate statistics over arbitrarily sized, arbitrarily accurate sliding windows with significantly reduced memory and computation requirements.

2.3.1 Further Discussion of the $k_0$ Parameter:

As noted above, $k_0$ is used to control the operating congestion (e.g., queuing delay, packet loss levels, level of ECN markings, etc.) observed during a particular communications session. Initial values for $k_0$ can be set in a number of ways. For example, in a tested embodiment, the initial value was set using an expression such as $k_0 = R^{MAX}\delta_0$, where $R^{MAX}$ is an initial estimate of bottleneck link capacity (i.e., link rate capacity) and $\delta_0$ is an initial estimate of queuing delay noise.

The initial estimate of $\delta_0$ can be obtained using various techniques, such as, for example, by using historical information for the particular connection types involved in the current network connection between the sender and the receiver (e.g. 3G, 4G, Wi-Fi hotspot, WiMAX, cable, fiber, ADSL, etc.). Another technique for obtaining an initial estimate of $\delta_0$ is to perform an initial probe of the end-to-end connection between the sender and the receiver by sending traffic at a low rate that is below the known or expected link capacity. Similarly, the initial estimate of $R^{MAX}$ can be obtained by using historical information for the connection type or by initial probing by sending traffic at rates known to exceed the capacity of the link and then measuring the actual receiving rate. Other methods for obtaining initial estimates can also be used. Further, initial values can be set using arbitrary values without probing the network since the URCMPA will quickly converge towards optimum values for full and fair link utilization.

When adapting the value of $k_0$ during a communications session, it might seem like a good idea to make $k_0$ as low as possible to achieve a low operating congestion level. However, for networks that have background jitter, even if the network is not being congested, queuing delay can still be caused by various factors, such as, for example, random retransmissions on the wireless link. This results in inherent background noise and delay. Consequently, for such networks, if $k_0$ is set too low, the result is that there will be under-utilization of the bottleneck link, which means that the communications session is losing potential bandwidth by not using the link to its fullest capability. Advantageously, the techniques for adapting $k_0$, as a function of congestion signals allows $k_0$ to be dynamically reduced (or increased, if needed) while still approaching full link utilization at low congestion levels.

Note that if two or more concurrent flows (i.e., separate communications sessions) have different $k_0$ values across the same bottleneck link, this will typically result in unfairness in terms of sharing link capacity. Consequently, in various embodiments, the URCMPA operates to ensure that all flows sharing the link have approximately the same $k_0$ values to increase fairness in link sharing. However, it must be understood that there is no requirement for coordinating adaptation of $k_0$ values between concurrent flows across a bottleneck link during a communications session.

Further, in the typical case where networks are utilized many diverse senders and receivers, there may be one or more flows sharing a particular bottleneck link that does not have the capability to adjust $k_0$. Similarly, one or more flows may attempt to utilize an unfair share of the link (e.g., a TCP flow that comes on the bottleneck link). In either case, the URCMPA attempts to fairly compete with the other flows by increasing the congestion level of the communications session by adaptively increasing the $k_0$ value. Then, when the competing flow leaves the link, the URCMPA will detect this situation and adaptively reduce $k_0$ to lower congestion levels of the communications session.

2.3.2 Further Discussion of the $k_2$ Parameter:

As noted above, $k_2$ is used to control the speed of convergence and oscillation of the communications rate. In general, it is advantageous to use values of $k_2$ that are high enough to achieve fast convergence without using values that are so high that rate oscillations begin to occur when the communications session is operating in steady state. Consequently, in various embodiments, the URCMPA operates such that when the current rate is relatively far away from the maximum rate, $R^{MAX}$, $k_2$ is adapted upwards to ramp the current rate up faster, then as the current rate approaches $R^{MAX}$, the value of $k_2$ is adaptively lowered so that oscillations in the rate do not occur. As such, it should be understood that $k_2$ does not control operating congestion, link utilization, or fairness, but rather, it simply controls the rate of convergence towards $R^{MAX}$.

There are a wide variety of techniques that can be used to set, and adapt, $k_2$, and it should be understood that method used for setting the value of $k_2$ can be independently chosen from the method used to set $k_0$. One method for setting the initial value of $k_2$ is to compute $k_2$ as a function of a current average sending rate over a sliding window (set on the order of about 10 seconds in a tested embodiment of the URCMPA) relative to $R^{MAX}$. Note that one example of this concept is discussed in further detail below with respect to Equation (6). Other methods that can be used for setting or adapting $k_2$ include, but are not limited to setting $k_2$ to a constant value while adaptively varying $k_0$.

2.4 URCMPA Architecture and Applications

Figure 2:
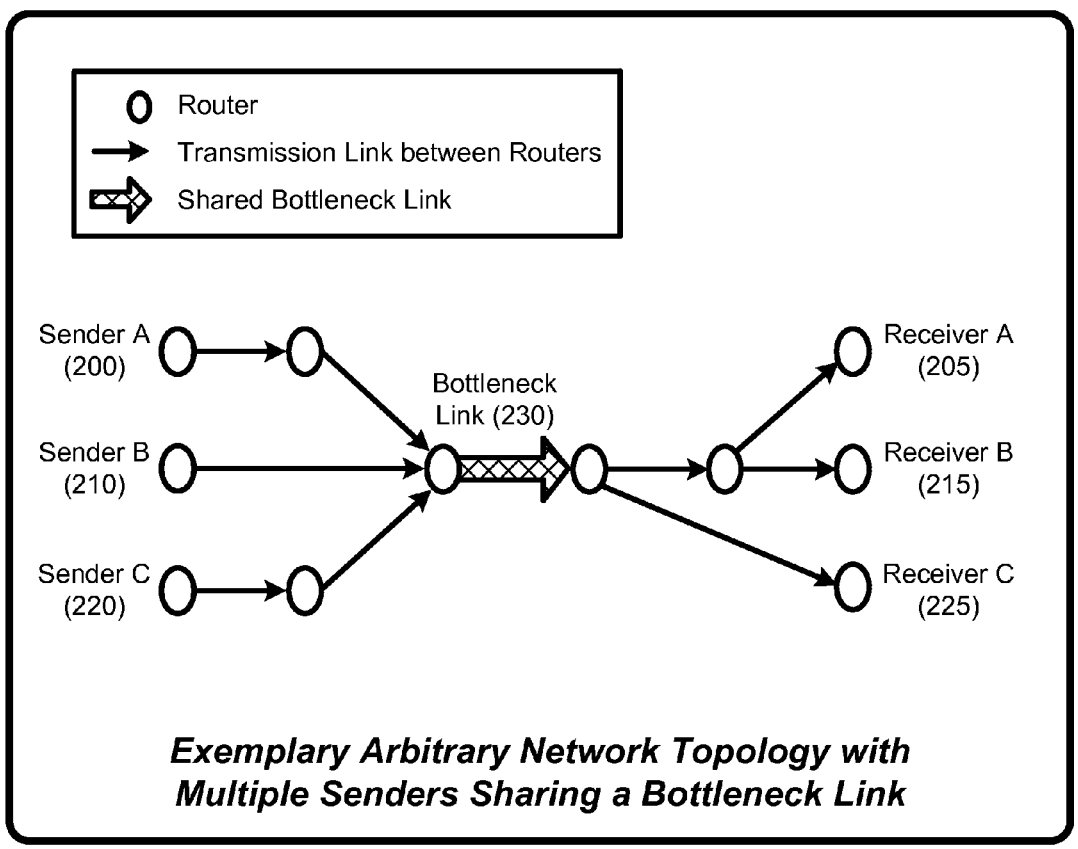
FIG. 2 provides a simple example of an arbitrary network topology wherein multiple senders share a bottleneck link in an arbitrary network, as described herein.

The URCMPA is designed for RTC-type applications (e.g., video conferencing, online gaming, etc.) that transmit multimedia data (e.g., audio, video, documents, etc.) between two or more parties on a network through a shared bottleneck link, as illustrated by FIG. 2. For each instance of the application, one party is designated as the sender, and the other party as the receiver. Note that a bi-directional RTC application, e.g., video conferencing, is considered to consist of two URCMPA-based sessions that communicate in opposite directions where each node serves as both sender and receiver.

For example, FIG. 2 illustrates a set of three sender nodes (i.e., "Sender A" 200, "Sender B" 210, and "Sender C" 220) and corresponding receiver nodes (i.e., "Receiver A" 205, "Receiver B" 215, and "Receiver C" 225). As illustrated by FIG. 2, the communication routes between each pair of sender and receiver nodes (e.g., "Sender A"-"Receiver A" pair) pass through a shared bottleneck link 230. Other nodes in the network topology are routers. Congestion occurs if the aggregate rate of traffic into a link exceeds the capacity of the link. These links are called bottleneck links. Congestion leads to congestion induced queuing delay and packet loss (and other congestion signals, such as, for example, ECN markings). Using a rate control protocol such as URCMPA, RTC applications operate to control the aggregate media coding rate so as to not exceed the capacity of the bottleneck links while maintaining low levels of queuing delay and packet loss (and/or other congestion signals). If there are multiple flows that are sharing the same bottleneck link, it is typically useful to fairly share the capacity of that link between the multiple senders.

For purposes of explanation, the additional delay above the minimum delay seen by a packet during transmission from the sender to the receiver is referred to herein as the queuing delay. Some component or portion of the observed queuing delay and packet loss can be attributed to actual congestion at the bottleneck links. This component of the queuing delay is referred to as congestion induced queuing delay. The component of the queuing delay that is not related to the queuing behavior of a bottleneck link is referred to as the noise in delay and packet loss. When the network is fully utilized, a certain amount of congestion induced queuing delay and/or packet loss is unavoidable. This unavoidable congestion induced queuing delay and/or packet loss is referred to herein the operating congestion level (or operating queuing delay and packet loss).'

In a decentralized system such as the Internet, an application does not a priori know the network topology, bottleneck link capacities, or information regarding other flows on the network.

Many algorithms, such as congestion control protocols in the various TCP variants (e.g., TCP-Tahoe, Reno, New Reno, Vegas, Compound TCP, etc.), have been proposed to allocate the available network resources in a fair manner among the competing users. The main principle behind these algorithms is fairly similar. Each application measures some form of the observed congestion signals, such as packet loss, queuing delay, and/or ECN markings and uses this information to directly adapt its transmission rate accordingly.

In contrast, as illustrated by FIG. 1, the URCMPA adapts the rate control parameters, $k_0$ and $k_2$, of a UM framework, with the adapted control parameters then being used to adapt the rate in response to congestion signals such as queuing delay, δ, and packet loss, ε. Note that FIG. 1 shows a sender-side rate control, in which the queuing delay δ and packet loss ε is sent back, and the rate control logic is in the sender. However, in various embodiments of the URCMPA, the receiver includes the rate control logic for adapting rate control parameters and adjusting the sending rate, as discussed above. In this case, rather than providing the congestion signals to the sender for use in adapting the rate control parameters, the receiver instead performs rate control adaptation and updated sending rate estimates throughout the RTC session, with the updated rate R then being provided to the sender.

Ideally, the rate control algorithm adapts only to the congestion induced queuing delay, $\delta^{cong}$ and packet loss $\epsilon^{cong}$ experienced at the bottleneck link, which reflects the network utilization state of the bottleneck link. However, in reality, the protocol observes the aggregated queuing delay δ and packet loss ε over the entire network route. Consequently, the URCMPA considers the non-congestion induced queuing delay and packet loss experienced at the links as random observation noise, represented as $\delta^{rand}$ and $\epsilon^{rand}$ respectively. As network connections become longer and more complicated between senders and receivers, such noise can become a relatively large consideration. For example, with long Internet connections (e.g., across country or across continent), packets may need to traverse numerous routers and may accumulate significant queuing delay noise and packet loss which is similar in magnitude to that experienced at the bottleneck links. In the case of Wi-Fi, poor wireless signal and interference can lead to MAC layer packet retransmission, which leads to significant noise in the observed queuing delay and packet loss. For 3G, 4G, and WiMAX type networks, packets are subject to the scheduling policy of the cellular tower, which can add significant queuing delay noise and packet loss.

Consequently, in various embodiments, the URCMPA attempts to estimate the background noise in queuing delay ($\delta^{rand}$) and packet loss ($\epsilon^{rand}$) by measuring the minimum (i.e., a historical low) observed queuing delay and packet loss in the particular RTC session. Then, the operating congestion level is set close to the average noise by adapting the parameter $k_0$ in the UM rate adaptation framework, as noted above. As discussed in further detail herein, this ensures that the congestion induced congestion levels are minimized which is necessary for good performance in RTC applications.

2.5 Utility Maximization Rate Control

The URCMPA starts with the utility maximization (UM) based framework designed to maximize the total utility of the network given a utility, which is a function of rate. Some common notation used in the discussion is provided above in Table 1. A common utility function is the log utility function which is given by the relationship $U_s(R) = k_{0,s} \log(R)$ for source s, where R is the transmission rate and $k_{0,s}$ is a constant weighting factor for each source.

In general, the URCMPA considers an arbitrary network which is represented as a graph (N,L), where N is the set of nodes, and L is the set of links connecting the nodes. Some subset S of N is the set of senders, which transmit at rate $R_s$. $C_l$ is the capacity of each link l∈L. $S_l$ is the set of sources which traverse a particular link l, and $L_s$ is the set of links which a source s traverses. The utility maximization problem is to maximize the total utility subject to the link constraints which can be stated as:

$$\max_{R_s \geq 0} \sum_{s \in S} k_{0,s} \log(R_s) \quad \text{s.t.} \quad \sum_{s \in S_l} R_s \leq C_l, \forall l \in L \quad \text{Equation (1)}$$

It is known that the following primal-dual algorithm converges to the globally optimal solution to this problem, $$\begin{cases} \dot{R}_s = k_{2,s}\left(k_{0,s} - R_s \sum_{l \in L_s} p_l\right)^+_{R_s} & \forall s \in S \\ \dot{p}_l = \frac{1}{C_l}\left(\sum_{s \in S_l} R_s - C_l\right)^+_{p_l} & \forall l \in L \end{cases} \quad \text{Equation (2)}$$

where $p_l$ are the Lagrange multipliers in the primal-dual UM problem, which can be viewed as the congestion level of link l. Note that the operator $(y)_x^+$ means that a projection is applied to y so that x≥0, and the operator $\dot{x}$ is the derivative of x.

From Equation (2), how the link congestion levels, $p_l(t)$, changes to yield the optimal solution can be written as:

$$p_l(t + \Delta T) = \max\left\{p_l(t_0) + \frac{1}{C_l}\left(\sum_{s \in S_l} R_s - C_l\right)\Delta T, 0\right\} \quad \text{Equation (3)}$$

similarly, how the source rates, $R_s$, is adapted to yield the optimal solution can be written as:

$$R_s(t+\Delta T) = \max\{R_s(t) + k_{2,s}(k_{0,s} - \rho_s R_s)\Delta T, 0\} \quad \text{Equation (4)}$$

where $\rho_s = \sum_{l \in L_s} p_l$ is the total congestion level that source s is observing and is the sum of all link congestion levels along the path traversed. Note that for purposes of explanation, the following discussion drops the subscript s from the variables and assumes that the $k_{0,s}$ is constant for all s.

2.6 Adaptive Parameter Adjustments

If the true congestion level can be accurately determined, the conventional UM framework provides full and fair link utilization given the capacity constraints with some notion of fairness depending on the utility function used. The main issues that limit the practical implementation of the UM framework for use with RTC applications on a wide variety of networks include, but are not limited to: 1) controlling the operating congestion level achieved, and 2) estimating the true congestion level given observed queuing delay and packet loss.

The rate update in Equation (4) uses parameters $k_0$ and $k_2$ and an estimate of the congestion level ρ. As noted above, in a conventional UM framework, parameters $k_0$ and $k_2$ are fixed throughout the communications session. In contrast, the URCMPA adapts the UM framework for use with RTC sessions by dynamically adapt the parameters $k_0$ and $k_2$ in the UM rate control framework throughout the RTC session. This allows the URCMPA to use this rate control framework universally, regardless of the network type, while providing low levels of the operating congestion level.

Assuming that the buffers at nodes are adequately sized to be larger than the operating congestion level, it can be assumed that the observed congestion level is the observed queuing delay, that is $\rho \approx \delta$, and thus $\Delta R = k_2(k_0 - \delta R)$. Note that the case when congestion induced packet loss is also an issue is discussed in Section 2.6.3. Thus, in steady state, the operating queuing delay can be written as $$\hat{\delta} = \frac{k_0}{\hat{R}},$$

where $k_0$ is a parameter in the UM framework, and $\hat{R}$ is the steady-state rate.

In UM rate control, one of the central issues is in picking an appropriate value of $k_0$. Suppose a fixed value for $k_0$ is used. For example, assume the use of a desired operating queuing delay of $\hat{\delta}=10$ ms and a steady state rate of $\hat{R}=1$ Mbps. In accordance with the relation noted above, this gives a value of $k_0=10000$. Unfortunately, if this fixed $k_0$ is used across a range of networks, the resulting communications streams will exhibit widely varying performance characteristics. For example, if the maximum rate is only 100 kbps per flow, then there will be an operating queuing delay of 100 ms instead of 10 ms. Similarly, if the average noise in queuing delay ($\delta^{rand}$) is 20 ms, then noise in queuing delay will likely be misinterpreted as false congestion, resulting in under-utilization of the link by half.

Advantageously, as discussed herein, the URCMPA adaptively sets the operating parameters $k_0$ and $k_2$ by learning network characteristics such as bottleneck link capacity, queuing delay noise, packet loss noise, etc.

2.6.1 Initial Parameter Setting:

In order to set initial parameter values, the URCMPA first considers, in the presence of noise in obtaining congestion level estimates, what is the lowest possible achievable queuing delay that the URCMPA can operate at and still result in full link utilization? The URCMPA also considers the parameter settings that allow for this. The observed queuing delay can be written as $\delta = \delta^{cong} + \delta^{rand}$, where $\delta^{cong}$ is the congestion induced queuing delay, and $\delta^{rand}$ is the random queuing delay due to noise along the link path and due to measurement noise. Since $\delta^{rand}$ is stochastic, instead of using $\dot{R}=0$ to analyze the steady-state behavior, the URCMPA uses the expectation to obtain $$\hat{\delta} = \delta^{cong} + E[\delta^{rand}] = \frac{k_0}{R}.$$

Full link utilization is possible if the operating congestion level is achievable, meaning that $\hat{\delta} > E[\delta^{rand}]$, otherwise $\delta^{cong} < 0$ which is not possible. In other words, there will be full link utilization provided that $k_0 \geq R(\delta^{cong} + E[\delta^{rand}])$.

If the capacity, C, of the bottleneck link is estimated as $R^{MAX}$ and the average random queuing delay, $E[\delta^{rand}]$, as $\delta_0$, then since $R \leq C$, have full link utilization can be achieved if:

$$k_0 = R^{MAX}(\delta_0 + \phi), \quad \text{Equation (5)}$$

where $\phi$ is a small constant and is the desired congestion induced queuing delay.

Further, as noted above, $k_2$ controls the rate of convergence and oscillation and does not affect the average operating queuing delay of the URCMPA. Since improved performance is observed by ramping up fast and eventually slowing the rate of convergence (to avoid or reduce possible oscillation in the sending rate) as the capacity of the link is approached, one reasonable way to set $k_2$ is to use $$k_2 = \frac{R^{MAX}}{k_0 M \sqrt{\frac{R^{MAX}}{R}} RTT_{min}} \quad \text{Equation (6)}$$

where M is some constant and $RTT_{min}$ is the minimum round-trip time (RTT) seen. In this way, the URCMPA limits the change to $$\frac{R^{MAX}}{M}$$

per RTT as R approaches $R^{MAX}$. For smaller R, the URCMPA allows for larger changes to enable rapid convergence to the maximum rate. Note that the method for setting $k_2$ illustrated by Equation (6) is simply one of a number of ways in which $k_2$ can be set. The basic idea is to use any desired relationship between the current rate, R, and the maximum rate, $R^{MAX}$, to avoid or reduce possible oscillation in the sending rate, while quickly ramping towards $R^{MAX}$. Further, as noted above, in various embodiments, $k_2$ can be set as a constant value while continuing to adapt $k_0$ throughout the RTC session.

2.6.2 In-Session Parameter Adaptation:

The discussion in Section 2.6.1 enables full link utilization at low congestion levels provided $R \approx R^{MAX}$ and provided $\delta_0 \approx E[\delta^{rand}]$. This is only correct if all of the following conditions are true:

The average random queuing delay, $E[\delta^{rand}]$, and the true capacity, C, of the bottleneck link are accurately estimated and non-changing, in other words, if $\delta_0 \approx E[\delta^{rand}]$ and $R^{MAX} \approx C$;

There is only a single URCMPA flow on a single bottleneck link. Otherwise, $$R = \frac{C}{N} < C,$$

where N is the number of URCMPA flows which gives $\hat{\delta}=N(\delta_0 + \phi)$ (a high operating queuing delay); and There are no competing non-URCMPA flows such as TCP present. Otherwise, $E[\delta^{rand}] > \delta_0$, since competing TCP flows across the bottleneck link will increase the inherent queuing delay on the network.

In practice, one or more of the above conditions may be violated which results in issues including:

An operating congestion level which is higher than what is achievable;

Bottleneck link under-utilization; and/or

Unfairness in bottleneck link utilization due to increased TCP usage of the bottleneck link.

To solve the issues noted above, the URCMPA dynamically adapts $R^{MAX}$, $\delta_0$, and $k_0$ using in-session adaptation. $k_2$ is set using Equation (6), some other desired relationship, or as a constant. The URCMPA first obtains initial estimates of $R^{MAX}$ and $\delta_0$ from which an initial $k_0$ is derived using the process described in Section 2.6.1. The initial estimate of $R^{MAX}$ is obtained by first probing the network bottleneck link capacity by sending at a very high rate (set to some level expected to exceed the bottleneck link capacity) and measuring the resulting receiving rate. The initial estimate of $\delta_0$ is obtained by taking the average queuing delay seen when sending at a very low rate (set to some level not exceed the link capacity). During the session, the URCMPA adapts these parameters using the following, $$R^{MAX} \leftarrow \max(R^{AVE}, R^{MAX}) \qquad \text{Equation (7)}$$

$$\delta_0 \leftarrow \min(\delta^{AVE}, \delta_0) \qquad \text{Equation (8)}$$

$$k_0 = \left(\beta \delta^{AVE} + \left(\sqrt{\frac{R^{MAX}}{R^{AVE}}} - \beta\right)\delta_0\right) R^{AVE} \qquad \text{Equation (9)}$$

where $\delta^{AVE}$ is the average queuing delay in some sliding time window (for example the average queuing delay in the last 10 seconds), $R^{AVE}$ is the average receiving rate in some sliding time window (for example the average receiving rate in the last 10 second sliding window), and $0 < \beta < 1.0$ is a constant (for example, $\beta = 0.8$ in a tested embodiment). Note that while a length of 10 seconds was observed to provide good performance across a range of networks, the length of the sliding windows can be set to any desired length to tune performance for particular networks or network conditions. By using the average value over a sliding window when performing the parameter adaptation, it can be seen that the timescale of parameter adaptation is slower than that of rate adaptation.

In general, in Equation (9), the first portion of the equation $$\left(\beta \delta^{AVE} + \left(\sqrt{\frac{R^{MAX}}{R^{AVE}}} - \beta\right)\delta_0\right)$$

is the target operating congestion level (in this case the congestion-induced queuing delay). This term contains two terms, with the first term, $\beta \delta^{AVE}$, responding to the current delay being seen across the network, and the second term, $$\left(\sqrt{\frac{R^{MAX}}{R^{AVE}}} - \beta\right)\delta_0,$$

responding to the lowest delay that has been seen during the particular RTC session.

One reason for adapting to the current delay, measured across the current sliding window, is that if the network characteristics are changing, e.g., a competing TCP flow enters the link, then $\delta^{AVE}$ will increase, since there will be higher delay levels. Then, when the TCP flow leaves, if $\beta$ was just 1.0, the communications session would continuously stay at high rate delay. However, by using a value of $\beta$ on the order of around 0.8, the first term would reduce to (0.8 $\delta^{AVE}$). Then, for example, if the session has achieved full rate such that $R^{AVE} \approx R^{MAX}$, then the second term would reduce to (1.0−0.8) $\delta_0 = 0.2\ \delta_0$. Per Equation (9), this in turn would give $k_0 = 0.8 \delta^{AVE} - 0.2 \delta_0$. Thus, it can be observed that this provides a backwards pressure that attempts to return the operating congestion level back to $\delta_0$. In other words, $\beta$ can be understood as a parameter that controls how fast the congestion level returns to $\delta_0$ (i.e., the lowest congestion level).

The first two adaptations in Equation (9) correct for under-estimation of $R^{MAX}$ and over-estimation of $E[\delta^{rand}]$ respectively. The last is meant to rectify situations where competing URCMPA or TCP flows are present and where $R^{MAX}$ is over-estimated or $E[\delta^{rand}]$ is under-estimated. To see why this is true, consider the steady-state operating queuing delay and achievable rate. In steady-state $R \approx R^{AVE}$ and $\hat{\delta} \approx \delta^{AVE}$. From this and Equation (9), the operating queuing delay and steady state rate is given by:

$$\hat{\delta} = \max\left(E[\delta^{rand}], \delta_0 \frac{\sqrt{\frac{R^{MAX}}{\hat{R}}} - \beta}{1 - \beta}\right) \qquad \text{Equation (10)}$$

$$\hat{R} = \min\left(C, \frac{R^{MAX}}{\left(\frac{\hat{\delta}}{\delta_0}(1-\beta) + \beta\right)^2}\right) \qquad \text{Equation (11)}$$

From Equation (10) and Equation (11), it can be seen that if $\delta_0$ and $R^{MAX}$ are correctly estimated, then with a single flow, a steady state rate of R=C and an operating queuing delay of $\hat{\delta} = E[\delta^{rand}]$ can be obtained. Further, if $R^{MAX}$ is over-estimated, then the operating queuing delay grows as a function of square root of the mis-estimation as opposed to growing linearly. If multiple URCMPA flows are present, the operating queuing delay grows as a function of square root of the number of URCMPA flows as opposed to growing linearly (for example 10 flows would increase queuing delay by $\sqrt{10} = 3.16$). However, as noted above, relationships between $\hat{R}$ and $R^{MAX}$ other than the square root illustrated by Equation (10) can be used. If $\delta_0$ underestimates $E[\delta^{rand}]$, then the term $\beta \delta^{AVE}$ would attempt to increase $k_0$ and thus the link under-utilization would not be as severe. If a more aggressive flow (such as TCP) is present across the bottleneck link, the term $\beta \delta^{AVE}$ would increase the operating point by increasing $k_0$ since $\delta^{AVE}$ will be larger. This allows the URCMPA to compete more effectively with the more aggressive flow. However, once the TCP flow leaves, since $\beta < 1$, the URCMPA will provide a downward pressure to decrease the operating queuing delay back towards $\delta_0$. Since the operating delay point increases as a function of rate (inversely proportional to rate), the URCMPA enables fair sharing when multiple URCMPA flows are present.

In a related embodiment of the URCMPA, one small modification to the $k_0$ adaptation of Equation (9) addresses the issue of a competing TCP flow detected in the bottleneck link. The modification Equation (9) involves the last term, where $R^{AVE}$ is used as the last term in the original $k_0$ adaptation, and where $R^{MAX}$ is used as the last term in the case where a competing TCP flow is detected. In particular, in this case, Equation (9) is modified to produce the following:

$$k_0 = \left(\beta \delta^{AVE} + \left(\sqrt{\frac{R^{MAX}}{R^{AVE}}} - \beta\right)\delta_0\right) R^{MAX} \qquad \text{Equation (12)}$$

Alternatively, other combinations of $R^{AVE}$ and $R^{MAX}$ can be used to set the last term.

The reason for this modification is that if there is a competing TCP flow across the bottleneck link, it will keep stealing rate from the RTC session, since $R^{AVE}$ will decrease, causing $k_0$ to decrease, and in turn causing $R^{AVE}$ to decrease, thus eventually starving the rate of the session. Thus, by using the maximum rate that the session has seen (i.e., $R^{MAX}$), the session will be able to maintain rate in the presence of the competing TCP flow. Then, once the TCP flow leaves, the URCMPA reverts to the adaptation of $k_0$ provided by Equation (9). TCP flow detection can be done by various well-known techniques, such as a observing a dramatic rise in the observed queuing delay or packet loss.

2.6.3 Combining Queuing Delay and Packet Loss:

In certain cases, the operating queuing delay of the URCMPA (and thus the operating congestion level) will be larger than the buffer size, B of the bottleneck link, that is $\hat{\rho} > B$. In these cases, congestion induced packet loss will be observed during the RTC session. To incorporate packet loss into the rate control strategy described above, the UCRM uses the following rate adjustment, $$\Delta R = k_2^\delta (k_0^\delta - \delta R) + k_2^\epsilon (k_0^\epsilon - \epsilon R) \quad \text{Equation (13)}$$

where there are separate $k_0$ and $k_2$ values for queuing delay (i.e., $k_0^\delta$ and $k_2^\delta$) and packet loss rate (i.e., $k_0^\epsilon$ and $k_2^\epsilon$). $k_0^\epsilon$ can be initially set using $R^{MAX}(E[\epsilon^{rand}] + \phi^\epsilon)$ in a similar manner to that discussed above with respect to Equation (5) in Section 2.6.1, while $k_2^\epsilon$ can be set in a similar manner to that discussed above with respect to Equation (6). Dynamic in-session parameter adaptation of $\epsilon_0$, $k_0^\epsilon$, and $k_2^\epsilon$ can be performed in a manner similar to that discussed above in Section 2.6.2 with respect to Equations (7) through (9).

Further, if Equation (13) is used to adjust the rate in cases when $\hat{\rho} \leq B$, then the assumption of the $\hat{\rho} > B$ leads to an additional operating queuing delay of $$\frac{k_2^\epsilon}{k_2^\delta} \phi^\epsilon.$$

Since $\phi^\epsilon$ (the operating congestion induced packet loss rate) is small, the additional queuing delay caused by also reacting to packet loss is also small. It can also be controlled by keeping $$\frac{k_2^\epsilon}{k_2^\delta}$$

small.

2.7 Clock Compensation

Advantageously, the clock compensation techniques described below are useful for any application or system wherein coordination of separate clocks is useful. For example, typical systems that involve independent processes that are to be coordinated based on time generally provide some mechanism to ensure that the clocks controlling each system are synchronized or that any drift between those clocks is known. This allows the independent processes to synchronize and coordinate their actions. Beyond the RTC scenarios described below, examples of synchronization include, but are not limited to ordering distributed events in a log file and ensuring that a process performs an action at a particular time. Examples of coordination include ensuring that processes agree on what actions will be performed (e.g., money will be withdrawn from the account), who will be performing actions (e.g., which database replica will process a request), and the state of a system (e.g., whether an elevator is stopped). Thus, while the clock compensation techniques described below are discussed in terms of determining packet delays for RTC sessions, it should be understood that these clock compensation techniques have a wide range of applications beyond use with RTC communications systems.

The rate control techniques described above use estimates of congestion signals such as queuing delay, $\delta$, loss rate $\epsilon$, etc., as congestion signals for adapting the rate control parameters of the UM framework of the communications session. A wide variety of known techniques exist for estimating loss rates, such as counting a number of lost packets over some time frame, or using the number of packets between successive losses to estimate the loss rate. Further, the queuing delay can be estimated using either round-trip time (via acknowledgements), or by using one-way delay measurements. One-way delay measurements provide a more accurate estimate of congestion since the congestion may exist in only one direction. For sender-side rate control, the receiver can timestamp the reception time when it sends acknowledgements back to the sender. For receiver-side rate control, the sender can insert the sent timestamp in the packet header when it sends the packet.

One obvious issue with using one-way delay information to estimate queuing delay is that the receive time and the send time are computed using two different clocks, one running on the sender machine, the other running on the receiver machine. As clocks may have different times and even different true running rates, this can make it difficult to obtain accurate estimates of queuing delay. As an example, if one clock is running faster than another, this will result in a mis-estimate of clock drift for congestion or under-estimation of the congestion level.

Consequently, in various embodiments, the URCMPA provides various clock compensation techniques based on formulating the queuing delay as a constrained recursive least squares problem.

In particular, let $\delta_n$ represent the queuing delay seen by the n-th packet which can be written as:

$$\delta_n = \delta_n^T - \delta_n^P \quad \text{Equation (14)}$$

where $\delta_n^T$ is the total delay experienced by packet n and $\delta_n^P = \delta^P$ is the propagation delay which is assumed to be constant, and thus is not a function of n.

In general, it is assumed that the queuing delay is computed as seen by the sender clock (which is assumed to be the "true" clock). Further, as discussed above, rate control is performed either by the sender or by the receiver based on the above-described techniques for adapting the rate control parameters. Therefore, advantageously, the processes described below can be adapted, if desired, to operate based on the assumption that the receiver clock is the true clock.

More specifically, assuming that the sender clock is the true clock, if S[n] is the send time of packet n using the sender clock, R[n] is the receive time of packet n using the receiver clock, and SR[n] is the receive time of packet n using the sender clock, the total delay (queuing delay plus propagation delay) seen by a packet n can be written as:

$$\delta_n^T = SR[n] - S[n]. \quad \text{Equation (15)}$$

A linear model for the receiver clock as a function of sender clock is assumed, which results in:

$$SR[n] = \alpha R[n] + \beta \quad \text{Equation (16)}$$

Consequently, the following relationship exists:

$$\begin{aligned} \delta_n &= \delta_n^T - \delta^P & \text{Equation (17)} \\ &= SR[n] - S[n] - \delta^P \\ &= (\alpha R[n] + \beta) - S[n] - \delta^P \\ &= \alpha R[n] + (\beta - \delta^P) - S[n] \\ &= \alpha R[n] + \gamma - S[n]. \end{aligned}$$

By defining $\gamma = \beta - \delta^P$, it can be seen that S[n] and R[n] (which are already available) are used to estimate the queuing delay of packet n, which leaves $\alpha$ and $\gamma$ to be determined.

In order to find α and γ, for packets which do not experience congestion (i.e., those where queuing delay is approximately zero) this means that $\delta_n=0$, which results in the following expression:

$$\alpha R[n_i]+\gamma=S[n_i] \quad \text{Equation (18)}$$

where $n_i$ is defined to be index of the i-th uncongested packet. Since there are multiple values of $R[n_i]$ and $S[n_i]$, this equation cannot in general hold true for all $n_i$. The problem of finding good values of α and γ to minimize a weighted error can be formulated as a weighted least squares (linear regression) problem. In other words, the problem can be stated as finding values of α and γ to minimize the following:

$$e_{total}^2 = \sum_{i=1}^{K} w_i^2 e^2[n_i] = \sum_{i=1}^{K} w_i^2 (S[n_i] - \hat{S}[n_i])^2 = \sum_{i=1}^{K} (w_i S[n_i] - w_i(\alpha R[n_i] + \gamma))^2 \quad \text{Equation (19)}$$

where $$\hat{S}[n_i]=\alpha R[n_i]+\gamma \quad \text{Equation (20)}$$

Therefore, by using matrix notation, the following expressions can be written:

$$\hat{S} = [\ w_1 \hat{S}[n_1]\ \ w_2 \hat{S}[n_2]\ \ldots\ w_K \hat{S}[n_K]\ ] \quad \text{Equation (21)}$$
$$= [\ \alpha\ \ \gamma\ ] \begin{bmatrix} w_1 R[n_1] & w_2 R[n_2] & \ldots & w_K R[n_K] \\ w_1 & w_2 & \ldots & w_K \end{bmatrix}$$
$$= AR$$

$$S = [\ S[n_1]\ \ S[n_2]\ \ldots\ S[n_K]\ ] \quad \text{Equation (22)}$$

The weights on the error function $w_i$ are used to weight the error. For example, it may be desirable to place more weight on recent samples while ignoring older samples. This may be useful, for example, if α and γ are changing and it is desirable to adapt to the correct values quicker.

Using linear regression theory, the solution to this is given by $$A=[\alpha\gamma]=(SR^*)(RR^*)^{-1} \quad \text{Equation (23)}$$

which can be solved, for example, by using various techniques such as a recursive least squares (RLS) algorithm.

However, rather than doing simple linear regression, the URCMPA applies additional constraints to the problem to achieve a more accurate solution. For example, for clock compensation, it is known that typical computer clocks have a certain maximum clock drift which allows constraints to be placed on α. In addition, it is known that in a real-world communications scenario, the queuing delay of each packet will be greater than zero, which allows additional constraints. Consequently, the constraints illustrated by Equation (24) can be placed on the problem to improve the solution:

$$\alpha \geq 1-\eta$$
$$\alpha \leq 1+\eta$$
$$\alpha R[n]+\gamma-S[n] \geq 0\ \forall n \quad \text{Equation (24)}$$

That is, the clock drift between two clocks (the term α) is bounded (to be between $[1-\eta, 1+\eta]$, where η is com constant) since clocks are guaranteed to have certain accuracy. The last constraint simply says that the time it takes for a packet to go from the sender to the receiver must be larger than zero, otherwise this would violate causality.

Note that the last constraint of Equation (24) can be written as:

$$\alpha R[n^0]+\gamma-S[n^0] \geq 0,$$

where $$n^0=\mathrm{argmin}_n(\alpha R[n]-S[n]) \quad \text{Equation (25)}$$

That is, the value of $\alpha R[n]+\gamma-S[n]$ must be greater than zero for the sample which has the minimum $\alpha R[n]-S[n]$. This is sufficient and necessary to guarantee that all $\alpha R[n]+\gamma-S[n]$ will be larger than zero.

In general, the constrained linear regression problem can be solved using convex optimization techniques for minimizing Equation (19) subject to constraints in Equation (24). In various embodiments, the URCMPA solves this problem directly, although the solutions are complicated. Consequently, in related embodiments, the problem is modified to a form that can be solved with relatively little complexity. In particular, the constraint of Equation (25) can be modified to the following form:

$$\alpha R[n^0]+\gamma-S[n^0]=\kappa$$

where $$n^0=\mathrm{argmin}_{n \in \mathcal{N}} (R[n]-S[n]) \quad \text{Equation (26)}$$

where $\mathcal{N}$ is a sliding window of certain size of previous samples (for example the last 20 seconds, or any other desired window size).

This above-described modification to the constraint results in three simplifications:

1) The constraint is identically some small value $\kappa \geq 0$ rather than equal to zero. This is reasonable since an uncongested packet is typically observed occasionally in any network. Normally, $\kappa=0$.
2) Instead of using the entire possible range of n, values of n are instead limited to $n \in \mathcal{N}$. If there truly is an uncongested sample within every $\mathcal{N}$ seconds, then this allows for the correction of mis-estimation of α and γ.
3) Finally, $R[n]-S[n]$ is used to determine the index $n^0$ instead of $\alpha R[n]-S[n]$. This is done so that it is not necessary to store all values of $R[n]$, $S[n]$. This assumption is reasonable since α is assumed to be close to 1.

With the simplifications described above, the constraint in Equation (26) can then be satisfied by setting:

$$\gamma=(S[n^0]+\kappa)-\alpha R[n^0] \quad \text{Equation (27)}$$

Using Equation (27), the weighted error function in Equation (19) can then be written to minimize as:

$$e_{total}^2 = \sum_{i=1}^{K} (w_i S[n_i] - w_i(\alpha R[n_i] + (S[n^0]+\kappa) - \alpha R[n^0]))^2 \quad \text{Eqn. (28)}$$
$$= \sum_{i=1}^{K} (w_i S[n_i] + \alpha w_i(R[n^0]-R[n_i]) - w_i(S[n^0]+\kappa))^2$$

Differentiating with respect to α and setting equal to zero, i.e., $$\frac{de_{total}^2}{d\alpha} = 0,$$

which equals $\sum_{i=1}^{K} 2(w_i S[n_i]+\alpha w_i(R[n^0]-R[n_i])-w_i(S[n^0]+\kappa))(w_i(R[n^0]-R[n_i]))$, resulting in the following:

$$\alpha \sum_{i=1}^{K} w_i^2 (R[n^0] - R[n_i]) = \qquad \text{Eqn. (29)}$$

$$\sum_{i=1}^{K} w_i^2 (S[n^0] + \kappa)(R[n^0] - R[n_i]) - w_i^2 S[n_i](R[n^0] - R[n_i])$$

and $$\alpha = \frac{\sum_{i=1}^{K} w_i^2 S[n_i] R[n_i] - R[n^0] \sum_{i=1}^{K} w_i^2 S[n_i]}{\sum_{i=1}^{K} w_i^2 R^2[n_i] - 2R[n^0] \sum_{i=1}^{K} w_i^2 R[n_i] + R^2[n^0] \sum_{i=1}^{K} w_i^2} + \qquad \text{Eqn. (30)}$$

$$\frac{-(S[n^0] + \kappa) \sum_{i=1}^{K} w_i^2 R[n_i] + (S[n^0] + \kappa) R[n^0] \sum_{i=1}^{K} w_i^2}{\sum_{i=1}^{K} w_i^2 R^2[n_i] - 2R[n^0] \sum_{i=1}^{K} w_i^2 R[n_i] + R^2[n^0] \sum_{i=1}^{K} w_i^2}$$

To satisfy the other constraints in Equation (24), α is bound using the following:

$$\alpha \leftarrow \max(1-\eta, \min(1+\eta)) \qquad \text{Equation (31)}$$

with γ then being found using Equation (27).

Further, κ is chosen depending on the maximum assumed clock drift. Suppose $n^o$ is the index of the minimum $R[n]-S[n]$ in the window $\mathcal{N}$. Also, suppose that $m^o$ is the index of the previous minimum. Further, suppose the reception time of packet $n^o$ is $t(n^o)$. The following expression can then be used to determine κ:

$$\kappa = \max(0, (\alpha R[n^0] - S[n^0]) + \qquad \text{Equation (32)}$$

$$(\alpha R[m^0] - S[m^0] + (t(n^0) - t(m^0))(1 + \eta)\zeta))$$

In other words, if the current minimum $\alpha R[n^o]-S[n^o]$ is larger than what is possible assuming the maximum clock drift of (1+η) from the previous minimum, then instead of assuming that the minimum queuing delay in the window is zero, it is assumed to be something larger than zero.

A common case is to use $$w_i^2 = \frac{1}{\lambda^i}.$$

Since minimizing $e_{total}^2$ is equivalent to minimizing $e_{total}^2 \lambda^K$, for a given K, the following recursion can be used to efficiently update α and γ. Suppose that information regarding a new packet which is declared to be "uncongested" is available. An uncongested packet can be one whose αR[n]−S[n] is very close to the current minimal $\alpha R[n^o]-S[n^o]$. If round trip time (RTT) information is also available from acknowledgements, a packet can be declared uncongested if the RTT is close to the minimal RTT. Alternatively, the URCMPA can simply use the packet with minimal R[n]−S[n] over some window. Assuming there are K−1 uncongested packets already, and a new uncongested packet (the K-th uncongested packet) is received, then updates are performed using the following:

$$A_K = \lambda A_{K-1} + S[n_K] R[n_K] \qquad \text{Equation (33)}$$

$$B_K = \lambda B_{K-1} + S[n_K]$$

-continued $$C_K = \lambda C_{K-1} + R[n_K]$$

$$D_K = \lambda D_{K-1} + R^2[n_K]$$

$$E_K = \lambda E_{K-1} + 1$$

$$\alpha_K = \frac{A_K - R[n^0] B_K - (S[n^0] + \kappa) C_K + (S[n^0] + \kappa) R[n^0] E_K}{D_K - 2R[n^0] C_K + R^2[n^0] E_K}$$

$$\alpha_K \leftarrow \max(1 - \eta, \min(\alpha_K, 1 + \eta))$$

$$\gamma_K = S[n^0] - \alpha_K R[n^0]$$

Finally, if a small amount of additional information is available, the error can be computed as:

$$F_K = \lambda F_{K-1} + S^2[n_K]$$

$$e_{total}^2 = F_K - 2(\alpha_K A_K + \gamma_K B_K) + (\alpha_K^2 D_K + 2\alpha_K \gamma_K C_K + \gamma_K^2 E_K) \qquad \text{Equation (34)}$$

Figure 3:
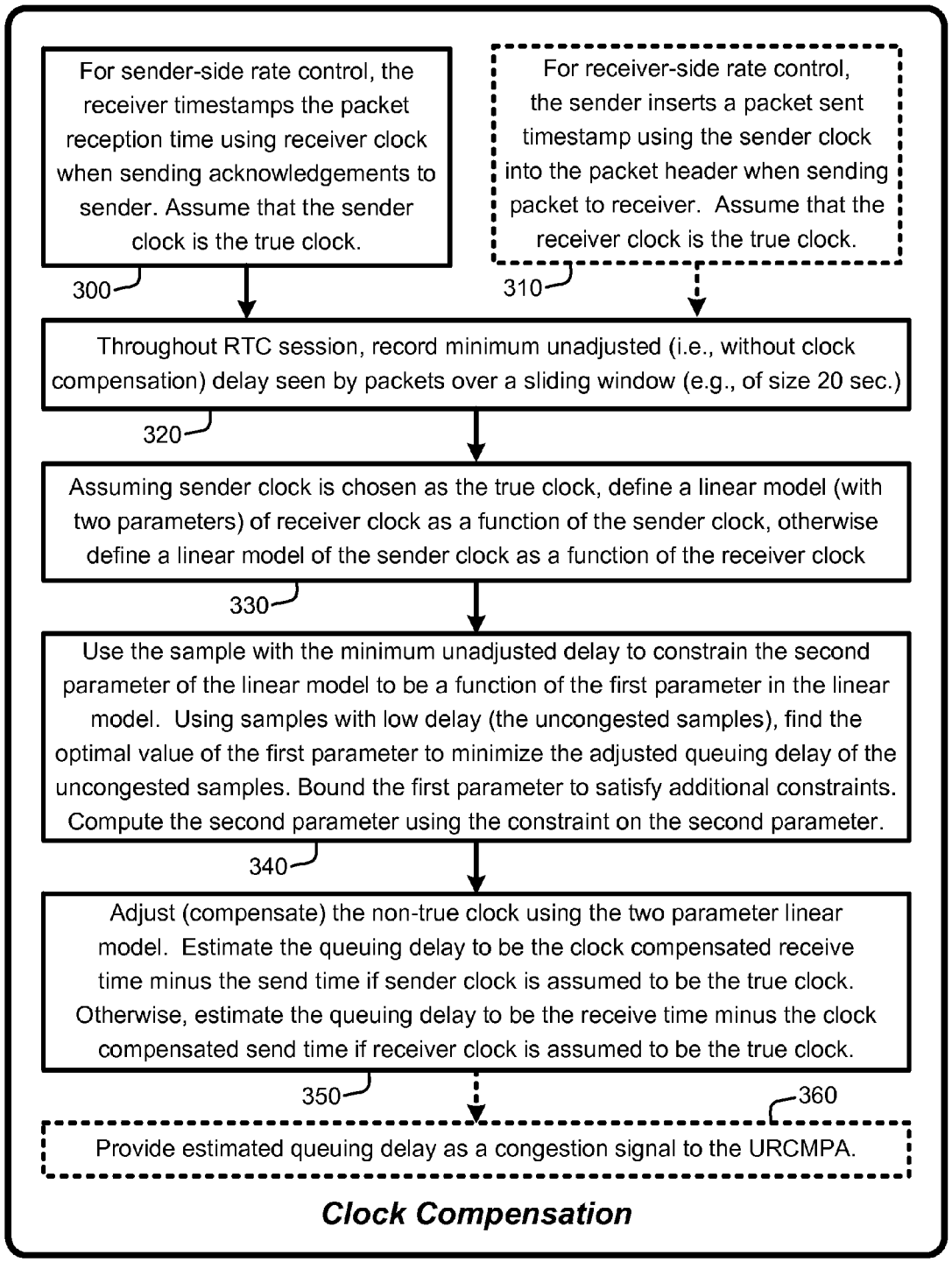
FIG. 3 provides a general system flow diagram that illustrates an exemplary process for compensating for clock differences between a sender and a receiver for estimating queuing delay using one-way delay information between a sender and a receiver, as described herein.

2.7.1 Clock Compensation Flow Diagram:

The processes discussed above for compensating for clock drift to enable accurate packet delay estimates based on one-way delay times are further illustrated by the general operational flow diagram of FIG. 3. In particular, FIG. 3 provides an exemplary operational flow diagram that summarizes the operation of some of the various embodiments of the clock compensation capabilities of the URCMPA. Note that FIG. 3 is not intended to be an exhaustive representation of all of the various clock compensation embodiments of the URCMPA described herein, and that the embodiments represented in FIG. 3 are provided only for purposes of explanation.

Further, it should be noted that any boxes and interconnections between boxes that are represented by broken or dashed lines in FIG. 3 represent optional or alternate embodiments of the clock compensation capabilities of the URCMPA, and that any or all of these optional or alternate embodiments, as described below, may be used in combination with other alternate embodiments that are described throughout this document.

In general, as discussed above, and as illustrated by FIG. 3, the clock compensation process can be accomplished from either the sender side or the receiver side.

When using the clock compensator for sender-side rate control (300), the receiver timestamps the packet reception time using receiver clock when sending acknowledgements to the sender. Further, in this case, it is assumed that the sender clock is the true clock. Conversely, when using the clock compensator for receiver-side rate control (310), the sender inserts a packet sent timestamp using the sender clock into the packet header when sending packet to receiver. In this case, it is assumed that the receiver clock is the true clock.

Then, throughout RTC session, the clock compensator records (320) the minimum unadjusted delay (i.e., without clock compensation) seen by packets over a sliding window (e.g., of size 20 seconds or some other desired period or some variable sliding window, as discussed above).

Next, assuming sender clock is chosen as the true clock, the clock compensator defines (330) a linear model (with two parameters) of the receiver clock as a function of the sender clock, otherwise define a linear model of the sender clock as a function of the receiver clock (for receiver-side control).

The clock compensator then uses the sample with the minimum unadjusted delay to constrain (340) the second parameter of the linear model to be a function of the first parameter in the linear model. Using samples with low delay (e.g., the uncongested samples), the clock compensator then finds an optimal value of the first parameter to minimize the adjusted queuing delay of the uncongested samples. The first parameter is then bound to satisfy additional constraints, with the clock compensator then computing the second parameter using the constraint on the second parameter.

Finally, the clock compensator adjusts (350) or compensates the non-true clock (i.e., the receiver clock in the case of sender-side control, and the sender clock in the case of receiver-side control) using the two parameter linear model. The clock compensator estimates the queuing delay to be the clock compensated receive time minus the send time if the sender clock is assumed to be the true clock. Otherwise, the clock compensator estimates the queuing delay to be the receive time minus the clock compensated send time if the receiver clock is assumed to be the true clock. Where the clock compensator is used to estimate delays for the URCMPA, the clock compensator then provides (360) the estimated queuing delay as a congestion signal to the URCMPA for use as discussed above in dynamically adapting the rate control parameters, which are in turn used to adapt the sending rate.

3.0 Operational Summary of the URCMPA

Figure 4:
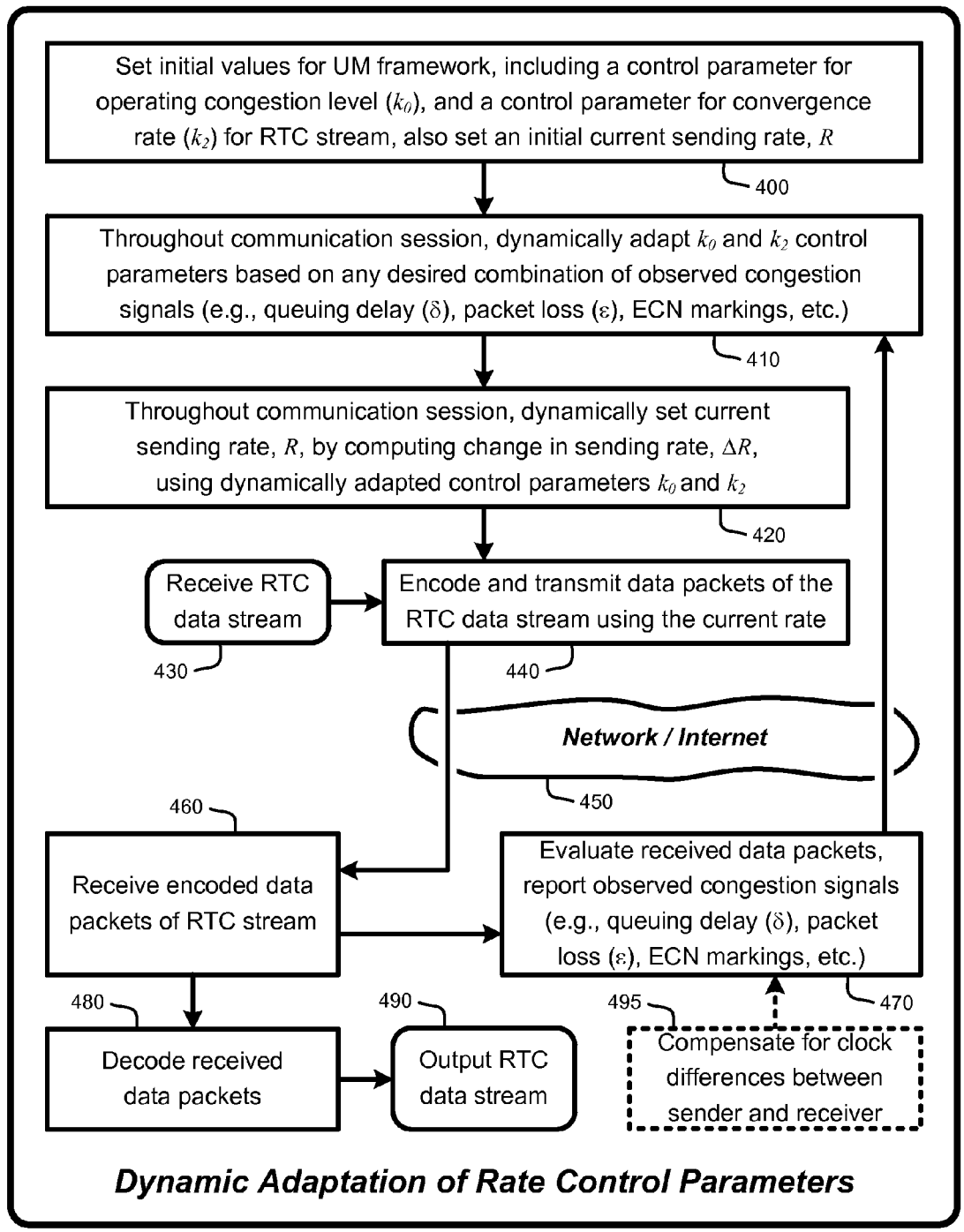
FIG. 4 provides a general system flow diagram that illustrates an exemplary process for implementing various embodiments of the URCMPA, as described herein.

The processes described above with respect to FIG. 1 through FIG. 3 and in further view of the detailed description provided above in Sections 1 and 2 are illustrated by the general operational flow diagram of FIG. 4. In particular, FIG. 4 provides an exemplary operational flow diagram that summarizes the operation of some of the various embodiments of the URCMPA. Note that FIG. 4 is not intended to be an exhaustive representation of all of the various embodiments of the URCMPA described herein, and that the embodiments represented in FIG. 4 are provided only for purposes of explanation.

Further, it should be noted that any boxes and interconnections between boxes that are represented by broken or dashed lines in FIG. 4 represent optional or alternate embodiments of the URCMPA described herein, and that any or all of these optional or alternate embodiments, as described below, may be used in combination with other alternate embodiments that are described throughout this document.

In general, as illustrated by FIG. 4, the URCMPA begins operation by setting (400) initial values for transmission of an RTC session using a modified UM framework. These parameters include a control parameter for operating congestion level ($k_0$), a control parameter for the convergence rate ($k_2$) for an RTC stream, and an initial current sending rate, R.

Then, throughout communication session, the URCMPA dynamically adapts (410) the $k_0$ and $k_2$ UM framework control parameters based on any desired combination of observed congestion signals. As discussed above, these congestion signals include, but are not limited to, queuing delay ($\delta$), packet loss ($\epsilon$), ECN markings, etc.

Given the dynamically adapted $k_0$ and $k_2$ control parameters, the URCMPA then dynamically adjusts (420) or adapts the current sending rate R on an ongoing basis throughout the communication session by computing a change in sending rate, $\Delta R$, using the dynamically adapted $k_0$ and $k_2$ control parameters.

Then, given the current sending rate, the URCMPA encodes (440) and transmits data packets of the received RTC data stream (430) using the current rate. As discussed above, any desired encoding technique can be used for this purpose. The encoded data packets are transmitted through a bottleneck link in an arbitrary wired and/or wireless network (450), portions of which may include the Internet, 3G, 4G, Wi-Fi, WiMAX, etc.

The transmitted data packets are then received (460) and decoded (480) to provide an output RTC data stream (490). In addition, the transmitted data packets, and other network signals, are evaluated (470) to determine and report observed congestion signals across the bottleneck link in the arbitrary wired and/or wireless network (450). In various embodiments, packet queuing delay is in part determined based on techniques for automatically compensating (495) for clock differences between the sender and the receiver. As discussed above, the clock compensation process enables the URCMPA to use one-way delay information to estimate highly accurate packet queuing delay times given an unknown clock drift rate of the sender or receiver.

4.0 Exemplary Operating Environments

Figure 5:
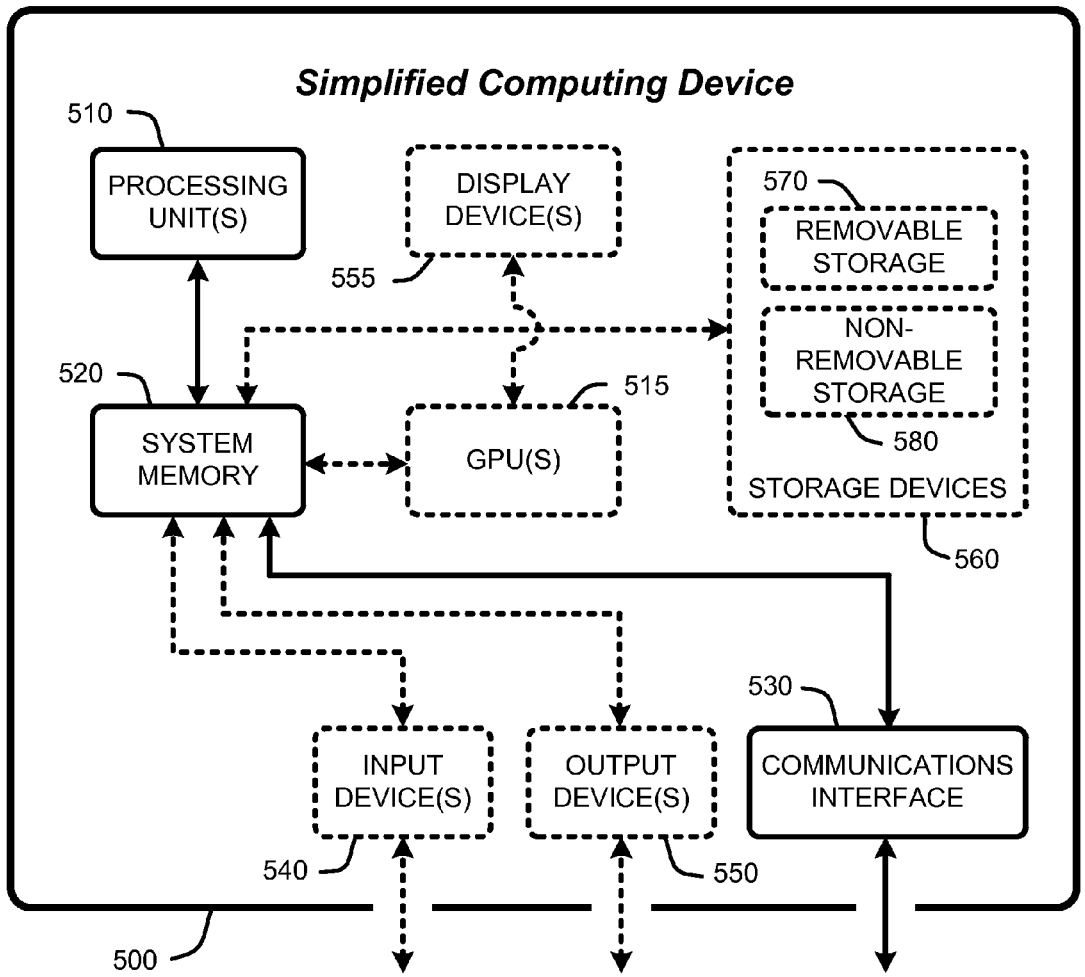
FIG. 5 is a general system diagram depicting a simplified general-purpose computing device having simplified computing and I/O capabilities for use in implementing various embodiments of the URCMPA, as described herein.

The URCMPA described herein is operational within numerous types of general purpose or special purpose computing system environments or configurations. FIG. 5 illustrates a simplified example of a general-purpose computer system on which various embodiments and elements of the URCMPA, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device such as computer 500. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the URCMPA, the device includes a sufficient computational capability and system memory to enable basic computational operations. In particular, as illustrated by FIG. 5, the computational capability is generally illustrated by one or more processing unit(s) 510, and may also include one or more GPUs 515, either or both in communication with system memory 520. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540 or combinations of such devices (e.g., pointing devices, keyboards, audio input devices, voice or speech-based input and control devices, video input devices, haptic input devices, touch input devices, devices for receiving wired or wireless data transmissions, etc.). The simplified computing device of FIG. 5 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 560 for general-purpose computers are well known to those skilled in the art, and will not be described in detail herein.

The simplified computing device of FIG. 5 may also include a variety of computer readable media. Computer readable media can be any available media that can be accessed by computer 500 via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the URCMPA described herein, or portions thereof, may be stored, received, transmitted, or read from any desired combination of computer or machine readable media or storage devices and communication media in the form of computer executable instructions or other data structures.

Finally, the URCMPA described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the URCMPA has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the URCMPA. It is intended that the scope of the invention be limited not by this detailed description, but rather by the claims appended hereto.

What is claimed is:

1. A computer-implemented process for dynamically adapting rate control parameters of a communications session, comprising using a computer to perform process actions for:
   instantiating a communications session using a Utility Maximization (UM) framework;
   wherein the UM framework includes a first rate control parameter for adjusting an operating congestion level of the communications session;
   while the communication session is ongoing, repeatedly performing process actions for:
      based on a current sending rate of the communications session, inferring current congestion levels of the communications session from one or more congestion signals derived from any of a current packet's congestion signals and a first sliding window of the congestion signals of the communications session,
      based on the current sending rate of the communications session, inferring longer-term congestion levels of the communications session from a second sliding window of the congestion signals of the communications session;
      dynamically adapting the first rate control parameter as a function of the longer-term inferred congestion levels and a current long-term average sending rate, and
      dynamically adjusting the current sending rate as a function of the dynamically adapted first rate control parameter and the inferred current congestion level.

2. The computer-implemented process of claim 1 wherein the UM framework includes a second rate control parameter for controlling a rate of convergence towards a steady-state sending rate of the communications session relative to the current sending rate of the communications session.

3. The computer-implemented process of claim 2 wherein dynamically adjusting the current sending rate as a function of the dynamically adapted first rate control parameter further includes dynamically adjusting the current sending rate as a function the second rate control parameter.

4. The computer-implemented process of claim 2 wherein the second rate control parameter is dynamically adapted while the communication session is ongoing as a function of the inferred current congestion levels.

5. The computer-implemented process of claim 1 wherein the congestion signals include one or more of estimated queuing delay, and estimated packet loss rates.

6. The computer-implemented process of claim 5 wherein the congestion signals further include Explicit Congestion Notification (ECN) marking signals.

7. The computer-implemented process of claim 1 wherein the dynamic update of the first parameter is also a function of an estimated maximum rate capacity of a bottleneck link and minimum congestion signals levels seen when an aggregate rate into the bottleneck link is below the capacity.

8. A system for adapting rate control parameters of a Utility Maximization (UM) based communications session, comprising using a computing device for:
initiating a UM-based communication session using an initial estimate of a bottleneck link rate capacity and an initial estimate of a minimum congestion level when an aggregate rate into the bottleneck link is below the bottleneck link rate capacity;
wherein the UM-based communication session includes a first rate control parameter for adjusting an operating congestion level of the UM-based communications session;
evaluating one or more congestion signals obtained from one or more sequential packets on an ongoing basis throughout the UM-based communication session to infer a current congestion level for those packets;
evaluating one or more congestion signals obtained within sequential instances of a second sliding window throughout the UM-based communication session to infer a long-term value for the congestion level;
for each inferred current congestion level, adapting the first rate control parameter based on the inferred long-term congestion level obtained using the second sliding window and a long-term average sending rate; and
using each adaptation of the first rate control parameter to perform a corresponding adjustment to the current sending rate of the UM-based communication session.

9. The system of claim 8 wherein the one or more sequential packets are repeatedly obtained on an ongoing basis throughout the UM-based communication session using any of per-packet selection and selection of multiple sequential packets via sequential instances of a first sliding window.

10. The system of claim 8 further comprising a second rate control parameter for controlling a rate of convergence of a current sending rate of the UM-based communication session.

11. The system of claim 10 wherein each corresponding adjustment to the current sending rate is performed as a joint function of the first rate control parameter and the second rate control parameter.

12. The system of claim 10 wherein, for each sliding window, the second rate control parameter is adapted based on the inferred current congestion level of each sliding window.

13. The system of claim 8 wherein the congestion signals include one or more of estimated queuing delay, estimated packet loss rates, and Explicit Congestion Notification (ECN) marking signals.

14. A computer-readable storage media having computer executable instructions stored therein for adapting rate control parameters of a Utility Maximization (UM) based communications session, said instructions causing a computing device to execute a method comprising:
instantiating a communications session using a Utility Maximization (UM) framework;
wherein the UM framework includes a first rate control parameter for adjusting an operating congestion level of the communications session;
while the communication session is ongoing, repeatedly performing process actions for:
based on a current sending rate of the communications session, inferring current congestion levels of the communications session from one or more congestion signals derived from any of a current packet's congestion signals and a first sliding window of the congestion signals of the communications session,
based on a current sending rate of the communications session, inferring longer-term congestion levels of the communications session from a second sliding window of the congestion signals of the communications session;
dynamically adapting the first rate control parameter as a function of the inferred congestion levels, and a long-term average sending rate; and,
dynamically adjusting the current sending rate as a function of the dynamically adapted first rate control parameter and the inferred current congestion level.

15. The computer-readable storage media of claim 14 wherein the UM framework includes a second rate control parameter for controlling a rate of convergence towards a maximum sending rate of the communications session relative to the current sending rate of the communications session.

16. The computer-readable medium of claim 15 wherein dynamically adjusting the current sending rate as a function of the dynamically adapted first rate control parameter further includes dynamically adjusting the current sending rate as a function the second rate control parameter.

17. The computer-readable medium of claim 15 wherein the second rate control parameter is dynamically adapted while the communication session is ongoing as a function of the inferred current congestion levels.

18. The computer-readable storage media of claim 14 wherein the congestion signals include one or more of estimated queuing delay and estimated packet loss rates.

19. The computer-readable storage media of claim 18 wherein the congestion signals further include Explicit Congestion Notification (ECN) marking signals.

20. The computer-readable storage media of claim 14 wherein the dynamic update of the first parameter is also a function of an estimated maximum rate capacity of the bottleneck link and minimum congestion signals levels seen when an aggregate rate into the bottleneck link is below the capacity.

* * * * *